US009727560B2

(12) United States Patent
Chakerian et al.

(10) Patent No.: US 9,727,560 B2
(45) Date of Patent: Aug. 8, 2017

(54) SYSTEMS AND METHODS FOR ORGANIZING AND IDENTIFYING DOCUMENTS VIA HIERARCHIES AND DIMENSIONS OF TAGS

(71) Applicant: PALANTIR TECHNOLOGIES INC., Palo Alto, CA (US)

(72) Inventors: John Chakerian, Los Altos Hills, CA (US); Carl Freeland, Mountain View, CA (US); Jack Grossman, San Francisco, CA (US); Lawrence Manning, New York, NY (US); Adam Torres, Palo Alto, CA (US); Michael Yang, New York, NY (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 14/631,633

(22) Filed: Feb. 25, 2015

(65) Prior Publication Data
US 2016/0246784 A1 Aug. 25, 2016

(51) Int. Cl.
G06F 17/30 (2006.01)
G06F 3/0482 (2013.01)

(52) U.S. Cl.
CPC ...... *G06F 17/30011* (2013.01); *G06F 3/0482* (2013.01); *G06F 17/3056* (2013.01);
(Continued)

(58) Field of Classification Search
USPC ................ 707/607, 609, 687, 705, 790, 821
See application file for complete search history.

(56) References Cited

U.S. PATENT DOCUMENTS 5,109,399 A 4/1992 Thompson
5,329,108 A 7/1994 Lamoure
(Continued)

FOREIGN PATENT DOCUMENTS

CA 2666364 1/2015
CN 102546446 7/2012
(Continued)

OTHER PUBLICATIONS

"A First Look: Predicting Market Demand for Food Retail using a Huff Analysis," TRF Policy Solutions, Jul. 2012, pp. 30.
(Continued)

*Primary Examiner* — Sana Al Hashemi
(74) *Attorney, Agent, or Firm* — Knobbe, Martens, Olson & Bear LLP

(57) ABSTRACT

Computer-implemented systems and methods are disclosed to interface with one or more storage devices storing a plurality of documents, wherein each of the plurality of documents is associated with one or more tags of one or more predefined hierarchies of tags, wherein the one or more hierarchies of tags include multiple dimensions. In accordance with some embodiments, a method is provided to identify one or more documents from the data storage devices. The method comprises acquiring, via an interface, a selection of one or more tags of the one or more predefined hierarchies of tags. The method further comprises identifying one or more documents from the data storage devices in response to the selection, the identified one or more documents having tags that have a relationship with the selected tags, and providing data corresponding to the identified documents for displaying in the interface.

21 Claims, 15 Drawing Sheets

(52) U.S. Cl.
CPC .. *G06F 17/30607* (2013.01); *G06F 17/30876* (2013.01); *G06F 17/30914* (2013.01)

(56) References Cited

U.S. PATENT DOCUMENTS

| | | | |
|---|---|---|---|
| 5,632,009 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer |
| 6,057,757 A | 5/2000 | Arrowsmith et al. |
| 6,091,956 A | 7/2000 | Hollenberg |
| 6,161,098 A | 12/2000 | Wallman |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,289,338 B1 | 9/2001 | Stoffel et al. |
| 6,341,310 B1 | 1/2002 | Leshem et al. |
| 6,366,933 B1 | 4/2002 | Ball et al. |
| 6,369,835 B1 | 4/2002 | Lin |
| 6,430,305 B1 | 8/2002 | Decker |
| 6,456,997 B1 | 9/2002 | Shukla |
| 6,463,404 B1 | 10/2002 | Appleby |
| 6,523,172 B1 | 2/2003 | Martinez-Guerra et al. |
| 6,539,538 B1 | 3/2003 | Brewster et al. |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,640,231 B1 | 10/2003 | Andersen et al. |
| 6,642,945 B1 | 11/2003 | Sharpe |
| 6,674,434 B1 | 1/2004 | Chojnacki et al. |
| 6,714,936 B1 | 3/2004 | Nevin, III |
| 6,748,481 B1 | 6/2004 | Parry et al. |
| 6,775,675 B1 | 8/2004 | Nwabueze et al. |
| 6,820,135 B1 * | 11/2004 | Dingman .......... G06F 17/30569 707/999.101 |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,027,974 B1 | 4/2006 | Busch et al. |
| 7,036,085 B2 | 4/2006 | Barros |
| 7,043,702 B2 | 5/2006 | Chi et al. |
| 7,055,110 B2 | 5/2006 | Kupka et al. |
| 7,089,541 B2 | 8/2006 | Ungar |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski et al. |
| 7,237,192 B1 | 6/2007 | Stephenson et al. |
| 7,240,330 B2 | 7/2007 | Fairweather |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,533,069 B2 | 5/2009 | Fairweather |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,685,083 B2 | 3/2010 | Fairweather |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,756,843 B1 | 7/2010 | Palmer |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,870,493 B2 | 1/2011 | Pall et al. |
| 7,877,421 B2 | 1/2011 | Berger et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,933,929 B1 * | 4/2011 | McClendon et al. ......... 707/802 |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,103,543 B1 | 1/2012 | Zwicky |
| 8,117,022 B2 | 2/2012 | Linker |
| 8,132,149 B2 | 3/2012 | Shenfield et al. |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,271,948 B2 | 9/2012 | Talozi et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |

(56) References Cited

U.S. PATENT DOCUMENTS

| | | |
|---|---|---|
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,623 B2 | 7/2013 | Jain et al. |
| 8,489,641 B1 | 7/2013 | Seefeld et al. |
| 8,498,984 B1 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,560,494 B1 | 10/2013 | Downing et al. |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,688,573 B1 | 4/2014 | Rukonic et al. |
| 8,689,108 B1 | 4/2014 | Duffield et al. |
| 8,689,182 B2 | 4/2014 | Leithead et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,855,999 B1 | 10/2014 | Elliot |
| 8,868,537 B1 | 10/2014 | Colgrove et al. |
| 8,903,717 B2 | 12/2014 | Elliot |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,930,897 B2 | 1/2015 | Nassar |
| 8,937,619 B2 | 1/2015 | Sharma et al. |
| 8,938,686 B1 | 1/2015 | Erenrich et al. |
| 8,949,164 B1 | 2/2015 | Mohler |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,100,428 B1 | 8/2015 | Visbal |
| 9,116,975 B2 | 8/2015 | Shankar et al. |
| 9,129,219 B1 | 9/2015 | Robertson et al. |
| 9,201,920 B2 | 12/2015 | Jain et al. |
| 9,223,773 B2 | 12/2015 | Isaacson |
| 2001/0021936 A1 | 9/2001 | Bertram |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0130907 A1 | 9/2002 | Chi et al. |
| 2002/0147805 A1 | 10/2002 | Leshem et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0039948 A1 | 2/2003 | Donahue |
| 2003/0126102 A1 | 7/2003 | Borthwick |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0172053 A1 | 9/2003 | Fairweather |
| 2003/0177112 A1 | 9/2003 | Gardner |
| 2003/0200217 A1 | 10/2003 | Ackerman |
| 2003/0225755 A1 | 12/2003 | Iwayama et al. |
| 2003/0227392 A1* | 12/2003 | Ebert et al. .............. 340/825.49 |
| 2003/0229848 A1 | 12/2003 | Arend et al. |
| 2004/0032432 A1 | 2/2004 | Baynger |
| 2004/0034570 A1 | 2/2004 | Davis |
| 2004/0044992 A1 | 3/2004 | Muller et al. |
| 2004/0064256 A1 | 4/2004 | Barinek et al. |
| 2004/0083466 A1 | 4/2004 | Dapp et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0111480 A1 | 6/2004 | Yue |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0163039 A1 | 8/2004 | Gorman |
| 2004/0181554 A1 | 9/2004 | Heckerman et al. |
| 2004/0193600 A1 | 9/2004 | Kaasten et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0080769 A1 | 4/2005 | Gemmell et al. |
| 2005/0086207 A1 | 4/2005 | Heuer et al. |
| 2005/0091420 A1 | 4/2005 | Snover et al. |
| 2005/0125715 A1 | 6/2005 | Franco et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0045470 A1 | 3/2006 | Poslinski et al. |
| 2006/0059139 A1 | 3/2006 | Robinson |
| 2006/0074866 A1 | 4/2006 | Chamberlain et al. |
| 2006/0074881 A1 | 4/2006 | Vembu et al. |
| 2006/0080619 A1 | 4/2006 | Carlson et al. |
| 2006/0093222 A1 | 5/2006 | Saffer et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0074169 A1 | 3/2007 | Chess et al. |
| 2007/0078832 A1 | 4/2007 | Ott et al. |
| 2007/0078872 A1 | 4/2007 | Cohen |

(56) References Cited

U.S. PATENT DOCUMENTS

| | | |
|---|---|---|
| 2007/0083541 A1 | 4/2007 | Fraleigh et al. |
| 2007/0094389 A1 | 4/2007 | Nussey et al. |
| 2007/0112714 A1 | 5/2007 | Fairweather |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0174760 A1 | 7/2007 | Chamberlain et al. |
| 2007/0185867 A1 | 8/2007 | Maga |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0266336 A1 | 11/2007 | Nojima et al. |
| 2007/0284433 A1 | 12/2007 | Domenica et al. |
| 2007/0294643 A1 | 12/2007 | Kyle |
| 2008/0016216 A1 | 1/2008 | Worley et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0103996 A1 | 5/2008 | Forman et al. |
| 2008/0104019 A1 | 5/2008 | Nath |
| 2008/0126951 A1 | 5/2008 | Sood et al. |
| 2008/0140387 A1 | 6/2008 | Linker |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0228467 A1 | 9/2008 | Womack et al. |
| 2008/0243711 A1 | 10/2008 | Aymeloglu et al. |
| 2008/0244510 A1 | 10/2008 | Cote |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0281580 A1 | 11/2008 | Zabokritski |
| 2008/0288306 A1 | 11/2008 | MacIntyre et al. |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0055251 A1 | 2/2009 | Shah et al. |
| 2009/0076845 A1 | 3/2009 | Bellin et al. |
| 2009/0077062 A1* | 3/2009 | Spivack ............... G06Q 30/02 |
| 2009/0088964 A1 | 4/2009 | Schaaf et al. |
| 2009/0094166 A1 | 4/2009 | Aymeloglu et al. |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319891 A1 | 12/2009 | MacKinlay |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0131502 A1 | 5/2010 | Fordham |
| 2010/0161735 A1 | 6/2010 | Sharma |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0204983 A1 | 8/2010 | Chung et al. |
| 2010/0228812 A1 | 9/2010 | Uomini |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306285 A1 | 12/2010 | Shah et al. |
| 2010/0306713 A1 | 12/2010 | Geisner et al. |
| 2010/0312837 A1 | 12/2010 | Bodapati et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0029526 A1 | 2/2011 | Knight et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1* | 9/2011 | Henkin ............... G06Q 30/00 |
| | | 705/14.49 |
| 2011/0218934 A1 | 9/2011 | Elser |
| 2011/0218955 A1 | 9/2011 | Tang |

(56) References Cited

U.S. PATENT DOCUMENTS

| | | |
|---|---|---|
| 2011/0219450 A1 | 9/2011 | McDougal et al. |
| 2011/0225198 A1 | 9/2011 | Edwards et al. |
| 2011/0238495 A1 | 9/2011 | Kang |
| 2011/0238553 A1 | 9/2011 | Raj et al. |
| 2011/0251951 A1 | 10/2011 | Kolkowitz |
| 2011/0258158 A1 | 10/2011 | Resende et al. |
| 2011/0258216 A1 | 10/2011 | Supakkul et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066210 A1 | 3/2012 | Mukerjee et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084287 A1 | 4/2012 | Lakshminarayan et al. |
| 2012/0106801 A1 | 5/2012 | Jackson |
| 2012/0110515 A1* | 5/2012 | Abramoff ......... G06F 17/30994 715/854 |
| 2012/0117082 A1 | 5/2012 | Koperda et al. |
| 2012/0131512 A1 | 5/2012 | Takeuchi et al. |
| 2012/0137235 A1 | 5/2012 | Ts et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0180002 A1 | 7/2012 | Campbell et al. |
| 2012/0191446 A1 | 7/2012 | Binsztok et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0304150 A1 | 11/2012 | Leithead et al. |
| 2012/0311684 A1 | 12/2012 | Paulsen et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0054306 A1 | 2/2013 | Bhalla |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0091084 A1 | 4/2013 | Lee |
| 2013/0096988 A1 | 4/2013 | Grossman et al. |
| 2013/0097482 A1 | 4/2013 | Marantz et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0124193 A1 | 5/2013 | Holmberg |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0212081 A1 | 8/2013 | Shenoy et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0275446 A1 | 10/2013 | Jain et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149436 A1 | 5/2014 | Bahrami et al. |
| 2014/0156527 A1 | 6/2014 | Grigg et al. |

(56) References Cited

U.S. PATENT DOCUMENTS

| | | | |
|---|---|---|---|
| 2014/0157172 A1 | 6/2014 | Peery et al. | |
| 2014/0164502 A1 | 6/2014 | Khodorenko et al. | |
| 2014/0189536 A1 | 7/2014 | Lange et al. | |
| 2014/0195515 A1 | 7/2014 | Baker et al. | |
| 2014/0195887 A1 | 7/2014 | Ellis et al. | |
| 2014/0214579 A1 | 7/2014 | Shen et al. | |
| 2014/0222521 A1 | 8/2014 | Chait | |
| 2014/0222793 A1 | 8/2014 | Sadkin et al. | |
| 2014/0229554 A1 | 8/2014 | Grunin et al. | |
| 2014/0244388 A1 | 8/2014 | Manouchehri et al. | |
| 2014/0267294 A1 | 9/2014 | Ma | |
| 2014/0267295 A1 | 9/2014 | Sharma | |
| 2014/0279824 A1 | 9/2014 | Tamayo | |
| 2014/0281850 A1* | 9/2014 | Prakash et al. | 715/202 |
| 2014/0282121 A1 | 9/2014 | Sun et al. | |
| 2014/0310266 A1 | 10/2014 | Greenfield | |
| 2014/0316911 A1 | 10/2014 | Gross | |
| 2014/0333651 A1 | 11/2014 | Cervelli et al. | |
| 2014/0337772 A1 | 11/2014 | Cervelli et al. | |
| 2014/0344230 A1 | 11/2014 | Krause et al. | |
| 2014/0358829 A1 | 12/2014 | Hurwitz | |
| 2014/0366132 A1 | 12/2014 | Stiansen et al. | |
| 2015/0019394 A1 | 1/2015 | Unser et al. | |
| 2015/0046481 A1 | 2/2015 | Elliot | |
| 2015/0046870 A1 | 2/2015 | Goldenberg et al. | |
| 2015/0073929 A1 | 3/2015 | Psota et al. | |
| 2015/0073954 A1 | 3/2015 | Braff | |
| 2015/0089424 A1 | 3/2015 | Duffield et al. | |
| 2015/0095773 A1 | 4/2015 | Gonsalves et al. | |
| 2015/0100559 A1 | 4/2015 | Nassar | |
| 2015/0100897 A1 | 4/2015 | Sun et al. | |
| 2015/0100907 A1 | 4/2015 | Erenrich et al. | |
| 2015/0106379 A1 | 4/2015 | Elliot et al. | |
| 2015/0134666 A1 | 5/2015 | Gattiker et al. | |
| 2015/0135256 A1 | 5/2015 | Hoy et al. | |
| 2015/0142766 A1 | 5/2015 | Jain et al. | |
| 2015/0169709 A1 | 6/2015 | Kara et al. | |
| 2015/0169726 A1 | 6/2015 | Kara et al. | |
| 2015/0170077 A1 | 6/2015 | Kara et al. | |
| 2015/0178825 A1 | 6/2015 | Huerta | |
| 2015/0178877 A1 | 6/2015 | Bogomolov et al. | |
| 2015/0186821 A1 | 7/2015 | Wang et al. | |
| 2015/0187036 A1 | 7/2015 | Wang et al. | |
| 2015/0188872 A1 | 7/2015 | White | |
| 2015/0227295 A1 | 8/2015 | Meiklejohn et al. | |
| 2015/0261847 A1 | 9/2015 | Ducott, III et al. | |
| 2015/0309719 A1 | 10/2015 | Ma et al. | |
| 2015/0317342 A1 | 11/2015 | Grossman et al. | |
| 2015/0324868 A1 | 11/2015 | Kaftan et al. | |
| 2015/0338233 A1 | 11/2015 | Cervelli et al. | |
| 2015/0379413 A1 | 12/2015 | Robertson et al. | |
| 2016/0004764 A1 | 1/2016 | Chakerian et al. | |

FOREIGN PATENT DOCUMENTS

| | | |
|---|---|---|
| CN | 103167093 | 6/2013 |
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014204840 | 9/2014 |
| DE | 102014215621 | 2/2015 |
| EP | 1672527 | 6/2006 |
| EP | 2487610 | 8/2012 |
| EP | 2551799 | 1/2013 |
| EP | 2560134 | 2/2013 |
| EP | 2778913 | 9/2014 |
| EP | 2778914 | 9/2014 |
| EP | 2778977 | 9/2014 |
| EP | 2778986 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2911078 | 8/2015 |
| EP | 2911100 | 8/2015 |
| EP | 2940603 | 11/2015 |
| EP | 2940609 | 11/2015 |
| EP | 2963595 | 1/2016 |
| EP | 3062244 | 8/2016 |
| GB | 2366498 | 3/2002 |
| GB | 2513007 | 10/2014 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 99/033000 | 7/1999 |
| WO | WO 99/033004 | 7/1999 |
| WO | WO 00/09529 | 2/2000 |
| WO | WO 02/065353 | 8/2002 |
| WO | WO 03/060751 | 7/2003 |
| WO | WO 2005/104736 | 11/2005 |
| WO | WO 2005/116851 | 12/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2011/071833 | 6/2011 |
| WO | WO 2013/010157 | 1/2013 |
| WO | WO 2013/102892 | 7/2013 |
| WO | WO 2013/115775 | 8/2013 |

OTHER PUBLICATIONS

"A Quick Guide to UniProtKB Swiss-Prot & TrEMBL," Sep. 2011, pp. 2.

Acklen, Laura, "Absolute Beginner's Guide to Microsoft Word 2003," Dec. 24, 2003, pp. 15-18, 34-41, 308-316.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Bluttman et al., "Excel Formulas and Functions for Dummies," 2005, Wiley Publishing, Inc., pp. 280, 284-286.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Canese et al., "Chapter 2: PubMed: The Bibliographic Database," The NCBI Handbook, Oct. 2002, pp. 1-10.

Capptain—Pilot Your Apps, <http://www.capptain.com> Printed Jul. 18, 2013 in 6 pages.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Conner, Nancy, "Google Apps: The Missing Manual," May 1, 2008, pp. 15.

Countly Mobile Analytics, <http://count.ly/> Printed Jul. 18, 2013 in 9 pages.

(56) References Cited

OTHER PUBLICATIONS

Definition "Identify" downloaded Jan. 22, 2015, 1 page.
Definition "Overlay" downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Distimo—App Analytics, <http://www.distimo.com/app-analytics> Printed Jul. 18, 2013 in 5 pages.
Dramowicz, Ela, "Retail Trade Area Analysis Using the Huff Model," Directions Magazine, Jul. 2, 2005, http://www.directionsmag.com/articles/retail-trade-area-analysis-using-the-huff-model/123411 (10 pages).
Flurry Analytics, <http://www.flurry.com/> Printed Jul. 18, 2013 in 14 pages.
GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation," Grant 98-IJ-CX-K005, May 6, 2002, 37 pages.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al. "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: Its Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hua et al., "A Multi-attribute Data Structure with Parallel Bloom Filters for Network Services" HiPC 2006, LNCS 4297, pp. 277-288, 2006.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
"HunchLab: Heat Map and Kernel Density Calculation for Crime Analysis," Azavea Journal, printed from wwwv.azavea.com/blogs/newsletter/v4i4/kernel-density-capabilities-added-to-hunchlab/ on Sep. 9, 2014, 2 pages.
Kahan et al., "Annotea: an open RDF infrastructure for shared Web annotations", Computer Networks 39, pp. 589-608, 2002.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Kontagent Mobile Analytics, <http://www.kontagent.com/> Printed Jul. 18, 2013 in 9 pages.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-theconnector-tool-HA010048532.aspx?CTT=1> printed Aug. 4, 2011 in 1 page.
Mixpanel—Mobile Analytics, <https://mixpanel.com/> Printed Jul. 18, 2013 in 13 pages.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents," 2002, 6 pages.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Open Web Analytics (OWA), <http://www.openwebanalytics.com/> Printed Jul. 19, 2013 in 5 pages.
Palmas et al., "An Edge-Bunding Layout for Interactive Parallel Coordinates" 2014 IEEE Pacific Visualization Symposium, pp. 57-64.
Piwik—Free Web Analytics Software. <http://piwik.org/> Printed Jul. 19, 2013 in18 pages.
Rouse, Margaret, "OLAP Cube," <http://searchdatamanagement.techtarget.com/definition/OLAP-cube>, Apr. 28, 2012, pp. 16.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
"The FASTA Program Package," fasta-36.3.4, Mar. 25, 2011, pp. 29.
trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines," M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wikipedia, "Federated Database System," Sep. 7, 2013, retrieved from the internet on Jan. 27, 2015 http://en.wikipedia.org/w/index.php?title=Federated_database_system&oldid=571954221.
Yang et al., "HTML page Analysis Based on Visual Cues," 2001, pp. 859-864.
Issue Notification for U.S. Appl. No. 13/917,571 dated Aug. 5, 2014.
Notice of Allowance for U.S. Appl. No. 14/102,394 dated Aug. 25, 2014.

(56) References Cited

OTHER PUBLICATIONS

Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/268,964 dated Dec. 3, 2014.
Notice of Allowance for U.S. Appl. No. 14/473,860 dated Jan. 5, 2015.
Notice of Allowance for U.S. Appl. No. 14/294,098 dated Dec. 29, 2014.
Official Communication for New Zealand Patent Application No. 624557 dated May 14, 2014.
Official Communication for New Zealand Patent Application No. 628585 dated Aug. 26, 2014.
Official Communication for European Patent Application No. 14158861.6 dated Jun. 16, 2014.
Official Communication for New Zealand Patent Application No. 622517 dated Apr. 3, 2014.
Official Communication for New Zealand Patent Application No. 628263 dated Aug. 12, 2014.
Official Communication for Great Britain Patent Application No. 1404457.2 dated Aug. 14, 2014.
Official Communication for New Zealand Patent Application No. 627962 dated Aug. 5, 2014.
Official Communication for European Patent Application No. 14159464.8 dated Jul. 31, 2014.
Official Communication for European Patent Application No. 14159464.8 dated Aug. 20, 2014.
Official Communication for European Patent Application No. 14159464.8 dated Sep. 22, 2014.
Official Communication for New Zealand Patent Application No. 628840 dated Aug. 28, 2014.
Official Communication in New Zealand Patent Application No. 628495 dated Aug. 19, 2014.
Official Communication for Great Britain Patent Application No. 1408025.3 dated Nov. 6, 2014.
Official Communication for New Zealand Patent Application No. 628161 dated Aug. 25, 2014.
Official Communication for Great Britain Patent Application No. 1404574.4 dated Dec. 18, 2014.
Official Communication for Great Britain Patent Application No. 1411984.6 dated Dec. 22, 2014.
Official Communication for European Patent Application No. 14180281.9 dated Jan. 26, 2015.
Official Communication for European Patent Application No. 14180142.3 dated Feb. 6, 2015.
Official Communication for European Patent Application No. 14186225.0 dated Feb. 13, 2015.
Official Communication for European Patent Application No. 14189344.6 dated Feb. 20, 2015.
Official Communication for Great Britain Patent Application No. 1404499.4 dated Sep. 29, 2014.
Official Communication for Great Britain Patent Application No. 1404489.5 dated Oct. 6, 2014.
Official Communication for Great Britain Patent Application No. 1404486.1 dated Aug. 27, 2014.
Official Communication for Great Britain Patent Application No. 1404499.4 dated Aug. 20, 2014.
Official Communication for Great Britain Patent Application No. 1404489.5 dated Aug. 27, 2014.
Official Communication for New Zealand Patent Application No. 622473 dated Mar. 27, 2014.
Official Communication for New Zealand Patent Application No. 622473 dated Jun. 19, 2014.
Official Communication for U.S. Appl. No. 14/289,596 dated Jul. 18, 2014.
Official Communication for U.S. Appl. No. 14/289,599 dated Jul. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Sep. 23, 2014.
Official Communication for U.S. Appl. No. 14/306,154 dated Sep. 9, 2014.
Official Communication for U.S. Appl. No. 14/306,147 dated Sep. 9, 2014.
Official Communication for U.S. Appl. No. 14/319,765 dated Nov. 25, 2014.
Official Communication for U.S. Appl. No. 14/323,935 dated Nov. 28, 2014.
Official Communication for U.S. Appl. No. 14/326,738 dated Dec. 2, 2014.
Official Communication for U.S. Appl. No. 14/225,160 dated Oct. 22, 2014.
Official Communication for U.S. Appl. No. 14/504,103 dated Feb. 5, 2015.
Official Communication for U.S. Appl. No. 14/289,596 dated Jan. 26, 2015.
Official Communication for U.S. Appl. No. 14/319,765 dated Feb. 4, 2015.
Official Communication for U.S. Appl. No. 14/306,138 dated Feb. 18, 2015.
Official Communication for U.S. Appl. No. 14/451,221 dated Oct. 21, 2014.
Official Communication for U.S. Appl. No. 14/463,615 dated Nov. 13, 2014.
Official Communication for U.S. Appl. No. 13/827,491 dated Dec. 1, 2014.
Official Communication for U.S. Appl. No. 14/479,863 dated Dec. 26, 2014.
Official Communication for U.S. Appl. No. 14/319,161 dated Jan. 23, 2015.
Official Communication for U.S. Appl. No. 14/483,527 dated Jan. 28, 2015.
Official Communication for U.S. Appl. No. 14/463,615 dated Jan. 28, 2015.
Official Communication for U.S. Appl. No. 14/225,084 dated Feb. 20, 2015.
Official Communication for U.S. Appl. No. 14/225,006 dated Feb. 27, 2015.
"A Word About Banks and the Laundering of Drug Money," Aug. 18, 2012, http://www.golemxiv.co.uk/2012/08/a-word-about-banks-and-the-laundering-of-drug-money/.
"Money Laundering Risks and E-Gaming: A European Overview and Assessment," 2009, http://www.cf.ac.uk/socsi/resources/Levi_Final_Money_Laundering_Risks_egaming.pdf.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
"Using Whois Based Geolocation and Google Maps API for Support Cybercrime Investigations," http://wseas.us/e-library/conferences/2013/Dubrovnik/TELECIRC/TELECIRC-32.pdf.
About 80 Minutes, "Palantir in a Number of Parts—Part 6—Graph," Mar. 21, 2013, pp. 1-6.
Alur et al., "Chapter 2: IBM InfoSphere DataStage Stages," IBM InfoSphere DataStage Data Flow and Job Design, Jul. 1, 2008, pp. 35-137.

(56) References Cited

OTHER PUBLICATIONS

Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Boyce, Jim, "Microsoft Outlook 2010 Inside Out," Aug. 1, 2010, retrieved from the internet https://capdtron.files.wordpress.com/2013/01/outlook-2010-inside_out.pdf.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chaudhuri et al., "An Overview of Business Intelligence Technology," Communications of the ACM, Aug. 2011, vol. 54, No. 8.
Cohn, et al., "Semi-supervised clustering with user feedback," Constrained Clustering: Advances in Algorithms, Theory, and Applications 4.1 (2003): 17-32.
Gesher, Ari, "Palantir Screenshots in the Wild: Swing Sightings," The Palantir Blog, Sep. 11, 2007, pp. 1-12.
Gu et al., "Record Linkage: Current Practice and Future Directions," Jan. 15, 2004, pp. 32.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Huang et al., "Systematic and Integrative Analysis of Large Gene Lists Using DAVID Bioinformatics Resources," Nature Protocols, 4.1, 2008, 44-57.
Li et al., "Interactive Multimodal Visual Search on Mobile Device," IEEE Transactions on Multimedia, vol. 15, No. 3, Apr. 1, 2013, pp. 594-607.
Localytics—Mobile App Marketing & Analytics, http://www.localytics.com/ Printed Jul. 18, 2013 in 12 pages.
Map Builder, "Rapid Mashup Development Tool for Google and Yahoo Maps!" http://web.archive.org/web/20090626224734/http://www.mapbuilder.net/ printed Jul. 20, 2012 in 2 pages.
Nolan et al., "MCARTA: A Malicious Code Automated Run-Time Analysis Framework," Homeland Security, 2012 IEEE Conference on Technologies for, Nov. 13, 2012, pp. 13-17.
Palantir Technologies, "Palantir Labs_Timeline," Oct. 1, 2010, retrieved from the internet https://www.youtube.com/watch?v=JCgDW5bru9M.
Perdisci et al., "Behavioral Clustering of HTTP-Based Malware and Signature Generation Using Malicious Network Traces," USENIX, Mar. 18, 2010, pp. 1-14.
QUEST, "Toad for Oracle 11.6_Guide to Using Toad," Sep. 24, 2012, pp. 1-162.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Symantec Corporation, "E-Security Begins with Sound Security Policies," Announcement Symantec, Jun. 14, 2001.
Thompson, Mick, "Getting Started with GEO," Getting Started with GEO, Jul. 26, 2011.
Umagandhi et al., "Search Query Recommendations Using Hybrid User Profile with Query Logs," International Journal of Computer Applications, vol. 80, No. 10, Oct. 1, 2013, pp. 7-18.
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title-Multimap&oldid=530800748.
Wright et al., "Palantir Technologies VAST 2010 Challenge Text Records_Investigations into Arms Dealing," Oct. 29, 2010, pp. 1-10.
Notice of Acceptance for Australian Patent Application No. 2014250678 dated Oct. 7, 2015.
Notice of Allowance for U.S. Appl. No. 12/556,318 dated Nov. 2, 2015.
Notice of Allowance for U.S. Appl. No. 14/148,568 dated Aug. 26, 2015.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/326,738 dated Nov. 18, 2015.
Notice of Allowance for U.S. Appl. No. 14/473,552 dated Jul. 24, 2015.
Notice of Allowance for U.S. Appl. No. 14/479,863 dated Mar. 31, 2015.
Notice of Allowance for U.S. Appl. No. 14/486,991 dated May 1, 2015.
Notice of Allowance for U.S. Appl. No. 14/504,103 dated May 18, 2015.
Notice of Allowance for U.S. Appl. No. 14/552,336 dated Nov. 3, 2015.
Notice of Allowance for U.S. Appl. No. 14/616,080 dated Apr. 2, 2015.
Notice of Allowance for U.S. Appl. No. 14/746,671 dated Jan. 21, 2016.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199182.8 dated Mar. 13, 2015.
Official Communication for European Patent Application No. 14200246.8 dated May 29, 2015.
Official Communication for European Patent Application No. 14200298.9 dated May 13, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15165244.3 dated Aug. 27, 2015.
Official Communication for European Patent Application No. 15175106.2 dated Nov. 5, 2015.

(56) References Cited

OTHER PUBLICATIONS

Official Communication for European Patent Application No. 15175151.8 dated Nov. 25, 2015.
Official Communication for European Patent Application No. 15181419.1 dated Sep. 29, 2015.
Official Communication for European Patent Application No. 15183721.8 dated Nov. 23, 2015.
Official Communication for European Patent Application No. 15184764.7 dated Dec. 14, 2015.
Official Communication for European Patent Application No. 16157173.2 dated Jul. 5, 2016.
Official Communication for Great Britain Patent Application No. 1404486.1 dated May 21, 2015.
Official Communication for Great Britain Patent Application No. 1404489.5 dated May 21, 2015.
Official Communication for Great Britain Patent Application No. 1404499.4 dated Jun. 11, 2015.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012437 dated Sep. 18, 2015.
Official Communication for Netherlands Patent Application No. 2012438 dated Sep. 21, 2015.
Official Communication for Netherlands Patent Application No. 2013306 dated Apr. 24, 2015.
Official Communication for New Zealand Patent Application No. 622513 dated Apr. 3, 2014.
Official Communication for U.S. Appl. No. 12/556,318 dated Jul. 2, 2015.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/134,558 dated Oct. 7, 2015.
Official Communication for U.S. Appl. No. 14/141,252 dated Oct. 8, 2015.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/289,596 dated Apr. 30, 2015.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/306,138 dated Sep. 14, 2015.
Official Communication for U.S. Appl. No. 14/306,138 dated Dec. 24, 2015.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Dec. 24, 2015.
Official Communication for U.S. Appl. No. 14/306,147 dated Aug. 7, 2015.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Jul. 6, 2015.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/323,935 dated Jun. 22, 2015.
Official Communication for U.S. Appl. No. 14/323,935 dated Mar. 31, 2015.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/463,615 dated Sep. 10, 2015.
Official Communication for U.S. Appl. No. 14/463,615 dated May 21, 2015.
Official Communication for U.S. Appl. No. 14/463,615 dated Dec. 9, 2015.
Official Communication for U.S. Appl. No. 14/473,552 dated Feb. 24, 2015.
Official Communication for U.S. Appl. No. 14/483,527 dated Jun. 22, 2015.
Official Communication for U.S. Appl. No. 14/483,527 dated Oct. 28, 2015.
Official Communication for U.S. Appl. No. 14/486,991 dated Mar. 10, 2015.
Official Communication for U.S. Appl. No. 14/490,612 dated Aug. 18, 2015.
Official Communication for U.S. Appl. No. 14/504,103 dated Mar. 31, 2015.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/571,098 dated Nov. 10, 2015.
Official Communication for U.S. Appl. No. 14/571,098 dated Mar. 11, 2015.

(56) References Cited

OTHER PUBLICATIONS

Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/631,633 dated Sep. 10, 2015.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/726,353 dated Sep. 10, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/842,734 dated Nov. 19, 2015.
Restriction Requirement for U.S. Appl. No. 13/839,026 dated Apr. 2, 2015.
"A Tour of Pinboard," <http://pinboard.in/tour> as printed May 15, 2014 in 6 pages.
"BackTult—JD Edwards One World Version Control System," printed Jul. 23, 2007 in 1 page.
Delicious, <http://delicious.com/> as printed May 15, 2014 in 1 page.
Geiger, Jonathan G., "Data Quality Management, The Most Critical Initiative You Can Implement," Data Warehousing, Management and Quality, Paper 098-29, SUGI 29, Intelligent Solutions, Inc., Bounder, CO, pp. 14, accessed Oct. 3, 2013.
Kahan et al., "Annotea: an Open RDF Infastructure for Shared Web Annotations", Computer Networks, Elsevier Science Publishers B.V., vol. 39, No. 5, dated Aug. 5, 2002, pp. 589-608.
Klemmer et al., "Where Do Web Sites Come From? Capturing and Interacting with Design History," Association for Computing Machinery, CHI 2002, Apr. 20-25, 2002, Minneapolis, MN, pp. 8.
Kokossi et al., "D7-Dynamic Ontoloty Management System (Design)," Information Societies Technology Programme, Jan. 10, 2002, pp. 1-27.
Miklau et al., "Securing History: Privacy and Accountability in Database Systems," 3rd Biennial Conference on Innovative Data Systems Research (CIDR), Jan. 7-10, 2007, Asilomar, California, pp. 387-396.
Morrison et al., "Converting Users to Testers: An Alternative Approach to Load Test Script Creation, Parameterization and Data Corellation," CCSC: Southeastern Conference, JCSC 28, Dec. 2, 2012, pp. 188-196.
Niepert et al., "A Dynamic Ontology for a Dynamic Reference Work", Joint Conference on Digital Libraries, Jun. 17-22, 2007, Vancouver, British Columbia, Canada, pp. 1-10.
Nivas, Tuli, "Test Harness and Script Design Principles for Automated Testing of non-GUI or Web Based Applications," Performance Lab, Jun. 2011, pp. 30-37.
Palantir, "Extracting and Transforming Data with Kite," Palantir Technologies, Inc., Copyright 2010, pp. 38.
Palantir, "Kite," https://docs.palantir.com/gotham/3.11.1.0/adminreference/datasources.11 printed Aug. 30, 2013 in 2 pages.
Palantir, "Kite Data-Integration Process Overview," Palantir Technologies, Inc., Copyright 2010, pp. 48.
Palantir, "Kite Operations," Palantir Technologies, Inc., Copyright 2010, p. 1.
Palantir, "The Repository Element," https://docs.palantir.com/gotham/3.11.1.0/dataguide/kite_config_file.04 printed Aug. 30, 2013 in 2 pages.
Palantir, "Write a Kite Configuration File in Eclipse," Palantir Technologies, Inc., Copyright 2010, pp. 2.
Palantir, https://docs.palantir.com/gotham/3.11.1.0/dataguide/baggage/KiteSchema.xsd printed Apr. 4, 2014 in 4 pages.
Palermo, Christopher J., "Memorandum," [Disclosure relating to U.S. Appl. No. 13/916,447, filed Jun. 12, 2013, and related applications], Jan. 31, 2014 in 3 pages.
Wollrath et al., "A Distributed Object Model for the Java System," Conference on Object-Oriented Technologies and Systems, Jun. 17-21, 1996, pp. 219-231.
Notice of Allowance for U.S. Appl. No. 14/044,800 dated Sep. 2, 2014.
Notice of Allowance for U.S. Appl. No. 14/508,696 dated Jul. 27, 2015.
Notice of Allowance for U.S. Appl. No. 14/533,433 dated Sep. 1, 2015.
Official Communication for U.S. Appl. No. 14/148,568 dated Oct. 22, 2014.
Official Communication for U.S. Appl. No. 14/508,696 dated Mar. 2, 2015.
Official Communication for U.S. Appl. No. 14/025,653 dated Oct. 6, 2015.
Official Communication for U.S. Appl. No. 14/526,066 dated Jan. 21, 2016.
Official Communication for U.S. Appl. No. 14/025,653 dated Mar. 3, 2016.
Official Communication for Australian Patent Application No. 2014201506 dated Feb. 27, 2015.
Official Communication for Australian Patent Application No. 2014201507 dated Feb. 27, 2015.
Official Communication for Australian Patent Application No. 2014201580 dated Feb. 27, 2015.
Official Communication for Canadian Patent Application No. 2666364 dated Jun. 4, 2012.
Official Communication for European Patent Application No. 14158958.0 dated Jun. 3, 2014.
Official Communication for European Patent Application No. 14158977.0 dated Jun. 10, 2014.
Official Communication for European Patent Application No. 14159629.6 dated Jul. 31, 2014.
Official Communication for European Patent Application No. 14158977.0 dated Apr. 16, 2015.
Official Communication for European Patent Application No. 14158958.0 dated Apr. 16, 2015.
Official Communication for Great Britain Patent Application No. 1404479.6 dated Aug. 12, 2014.
Official Communication for Great Britain Patent Application No. 1413935.6 dated Jan. 27, 2015.
Official Communication for Great Britain Patent Application No. 1404479.6 dated Jul. 9, 2015.
Official Communication for Great Britain Patent Application No. 1413935.6 dated Dec. 21, 2015.
Official Communication for Israel Patent Application No. 198253 dated Nov. 24, 2014.
Official Communication for New Zealand Patent Application No. 622389 dated Mar. 20, 2014.
Official Communication for New Zealand Patent Application No. 622404 dated Mar. 20, 2014.
Official Communication for New Zealand Patent Application No. 622414 dated Mar. 24, 2014.
Official Communication for New Zealand Patent Application No. 622497 dated Mar. 26, 2014.
Official Communication for New Zealand Patent Application No. 622484 dated Apr. 2, 2014.

(56) References Cited

OTHER PUBLICATIONS

Official Communication for New Zealand Patent Application No. 622497 dated Jun. 19, 2014.

\* cited by examiner

SYSTEMS AND METHODS FOR ORGANIZING AND IDENTIFYING DOCUMENTS VIA HIERARCHIES AND DIMENSIONS OF TAGS

BACKGROUND

Data is commonly stored in computer-based systems in fixed, rigidly structured data stores. For example, one common type of data store is a "flat" file such as a spreadsheet, plain-text document, or XML document. Another common type of data store is a relational database comprising one or more tables. Other examples of data stores that comprise structured data include, without limitation, files systems, object collections, record collections, arrays, hierarchical trees, linked lists, stacks, and combinations thereof.

Often, the underlying structure of these types of data stores is poorly suited for data analysis. One approach for facilitating a more efficient analysis of data in such data stores is to reorganize that data according to an object model that defines object structures and relationships between the object structures. Tagging is a method used to create objects, properties, or links between objects and/or properties in structured or unstructured data. It can add structure to unstructured data or add further structure to structured data. An exemplary system and method for tagging is described in detail in U.S. application Ser. No. 14/025,653, filed on Sep. 12, 2013, and titled "Systems and Methods for Providing a Tagging Interface for External Content," which is incorporated herein by reference in its entirety.

BRIEF DESCRIPTION OF THE DRAWINGS

Reference will now be made to the accompanying drawings showing example embodiments of the present application, and in which:

FIGS. 8A-8B are screenshots depicting an exemplary interface for identifying and displaying documents based on tags from previously identified documents, consistent with embodiments of the present disclosure.

DETAILED DESCRIPTION OF EXEMPLARY EMBODIMENTS

Figure 1:
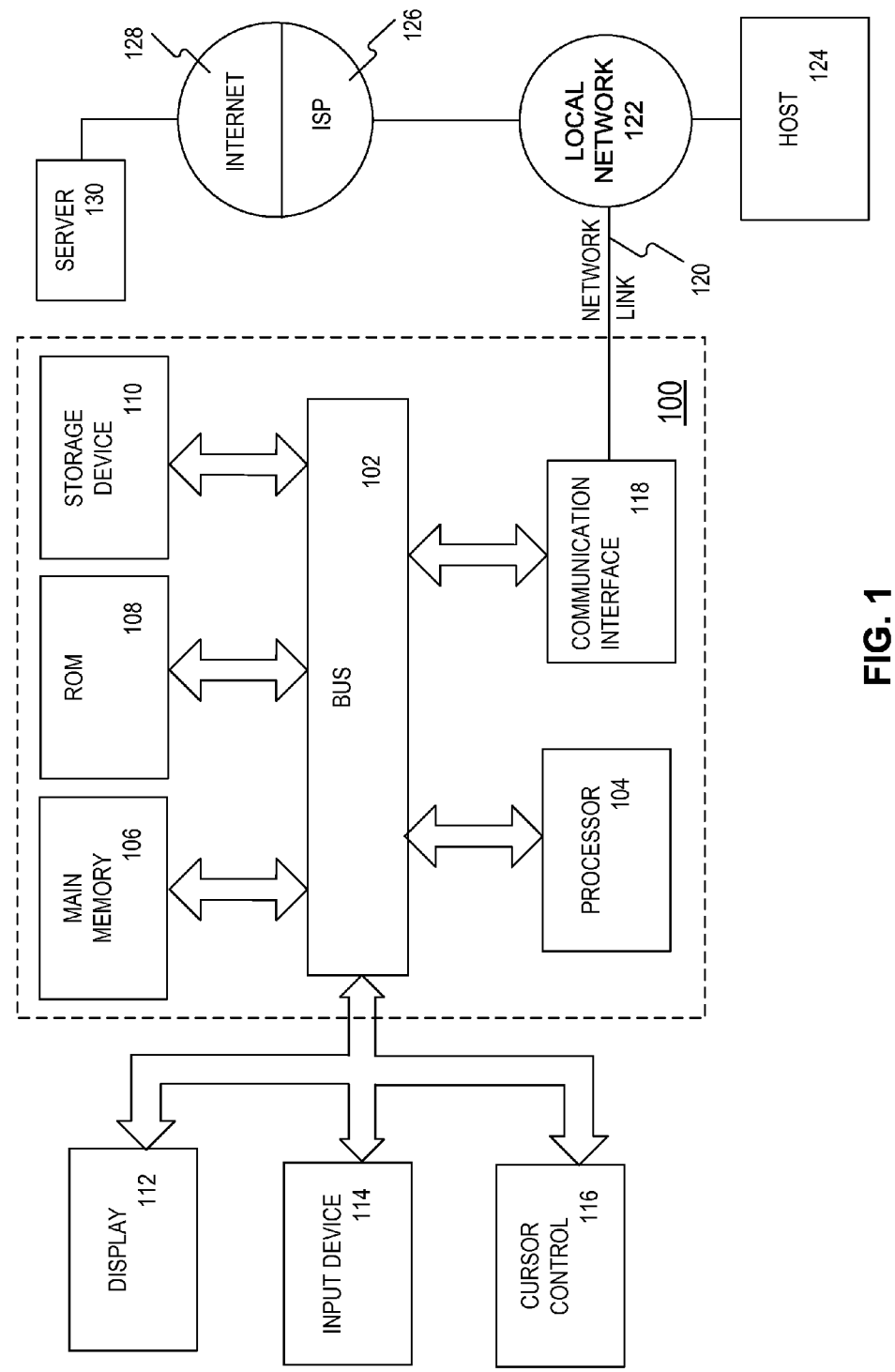
FIG. 1 is a block diagram of an exemplary computer system with which embodiments described herein can be implemented, consistent with embodiments of the present disclosure.

Reference will now be made in detail to the embodiments, the examples of which are illustrated in the accompanying drawings. Whenever possible, the same reference numbers will be used throughout the drawings to refer to the same or like parts.

Embodiments of the present disclosure provide a means to organize and access data structured with tag objects (e.g. by associating a portion or part or entirety of the data with tags) by providing a pre-defined hierarchy of tags. As an exemplary illustration, the hierarchy can include one or more dimensions, each dimension comprising a set of tags corresponding to that dimension. The pre-defined hierarchy of tags facilitates tag-based identification and retrieval of the data associated with one or more selected tags that are part of the hierarchy, which can allow a user of the system to navigate through a very large data sets to identify appropriate data or documents associated with or related to the one or more selected tags.

Embodiments of the present disclosure further provide an interface allowing the user to navigate through very large data sets to identify and display appropriate data or documents associated with or related to the one or more selected tags. Via the interface, a user can input a selection of tags and retrieve a document associated with the tags selection, as well as other documents that are related to the tags selection. The interface also updates the tags selection based on a document retrieved by the user, allowing the user to identify other related documents. The interface further facilitates a user's navigation through a very large data sets to identify appropriate data or documents associated with or related to the one or more selected tags.

The tag objects can include one or more attributes, and a relationship can be defined between the attributes of each tag object (or combinations thereof). As an exemplary illustration, the tag object can include attributes including a tag label, a tag type, and one or more properties. Moreover, based on these attributes, one or more relationships between tags can be defined.

After the one or more tags are selected in the interface, data associated with those tags can be acquired. Moreover, one or more other tags related to the selected tags can be identified, which can allow data associated with the one or more other tags to also be acquired. This further facilitates tag-based identification and retrieval of the data associated with tags that are part of the hierarchy by, for example, allowing the user to navigate within a huge universe of data structured with tags, guided by the pre-defined hierarchy of tags, as well as the pre-defined relationship between the tags in the hierarchy.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

FIG. 1 is a block diagram of an exemplary computer system 100 with which embodiments described herein can be implemented, consistent with embodiments of the present disclosure. Computer system 100 includes a bus 102 or other communication mechanism for communicating information, and one or more hardware processors 104 (denoted as processor 104 for purposes of simplicity) coupled with bus 102 for processing information. Hardware processor 104 can be, for example, one or microprocessors.

Computer system 100 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, after being stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk, optical disk, or USB thumb drive (Flash drive), etc., is provided and coupled to bus 102 for storing information and instructions.

Computer system 100 can be coupled via bus 102 to a display 112, such as a cathode ray tube (CRT), an liquid crystal display (LCD), or a touch screen, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computing system 100 can include a user interface module to implement a graphical user interface (GUI) that can be stored in a mass storage device as executable software codes that are executed by the one or more computing devices. This and other modules can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 100 can implement the techniques described herein using customized hard-wired logic, one or more ASICs or FPGAs, firmware and/or program logic which in combination with the computer system causes or programs computer system 100 to be a special-purpose machine. According to some embodiments, the operations, functionalities, and techniques and other features described herein are performed by computer system 100 in response to processor 104 executing one or more sequences of one or more instructions contained in main memory 106. Such instructions can be read into main memory 106 from another storage medium, such as storage device 110. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 110. Volatile media can include dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to processor 104 for execution. For example, the instructions can initially be carried on a magnetic disk or solid state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 110 either before or after execution by processor 104.

Computer system 100 can also include a communication interface 118 coupled to bus 102. Communication interface 118 can provide a two-way data communication coupling to a network link 120 that can be connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 can send and receive electrical, electromagnetic or optical signals that carry digital data streams representing various types of information.

Network link 120 can typically provide data communication through one or more networks to other data devices. For example, network link 120 can provide a connection through local network 122 to a host computer 124 or to data equipment operated by an Internet Service Provider (ISP) 126. ISP 126 in turn can provide data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, can be example forms of transmission media.

Computer system 100 can send messages and receive data, including program code, through the network(s), network link 120 and communication interface 118. In the Internet example, a server 130 can transmit a requested code for an application program through Internet 128, ISP 126, local network 122 and communication interface 118.

The received code can be executed by processor 104 as it is received, and/or stored in storage device 110, or other non-volatile storage for later execution. In some embodiments, server 130 can provide information for being displayed on a display.

Figure 2:
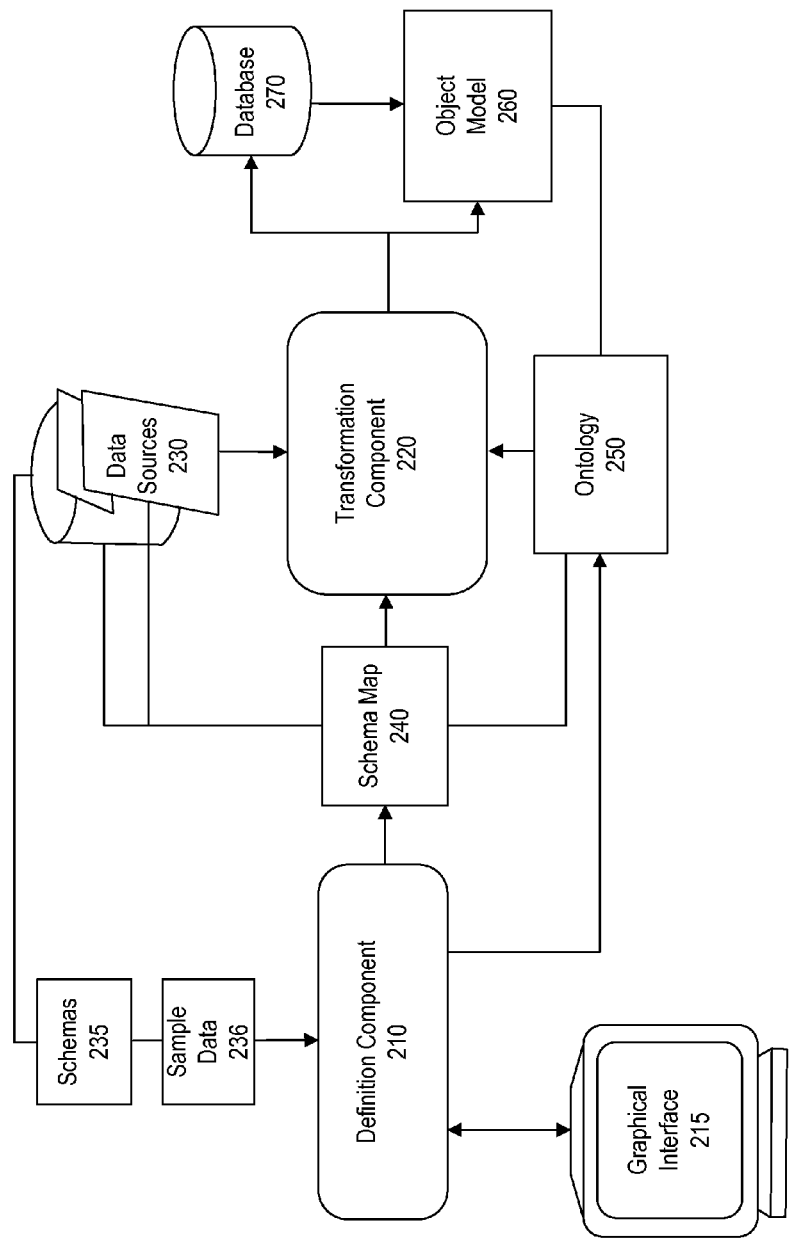
FIG. 2 is a block diagram depicting an exemplary internal database system, consistent with embodiments of the present disclosure.

FIG. 2 is a block diagram depicting an exemplary internal database system 200, consistent with embodiments of the present disclosure. Among other things, system 200 facilitates transformation of one or more data sources, such as data sources 230, into an object model 260, whose semantics are defined by an ontology 250. The transformation can be performed for a variety of reasons. For example, a database administrator can wish to import data from data sources 230 into a database 270 for persistently storing object model 260. As another example, a data presentation component (not depicted) can transform input data from data sources 230 "on the fly" into object model 260. Object model 260 can then be utilized, in conjunction with ontology 250, for analysis through graphs and/or other data visualization techniques.

System 200 comprises a definition component 210 and a transformation component 220, both implemented by one or more processors on one or more computing devices executing hardware and/or software-based logic for providing various functionality described herein. As will be appreciated from the present disclosure, system 200 can comprise fewer or additional components that provide various functionalities described herein. Such components are, for clarity, omitted from FIG. 1. Moreover, the component(s) of system 200 responsible for providing various functionalities can further vary from embodiment to embodiment.

Definition component 210 generates and/or modifies ontology 250 and a schema map 240. Exemplary embodiments for defining an ontology (such as ontology 250) is described in U.S. Pat. No. 7,962,495 (the '495 patent), issued Jun. 14, 2011, the entire contents of which are expressly incorporated herein by reference for all purposes. Among other things, the '495 patent describes embodiments that define a dynamic ontology for use in creating data in a database. For creating a database ontology, one or more object types are created where each object type can include one or more properties. The attributes of object types or property types of the ontology can be edited or modified at any time.

In some embodiments, each property type is declared to be representative of one or more object types. A property type is representative of an object type when the property type is intuitively associated with the object type. For example, a property type of "geographical location" may be representative of an object type "locale" but not representative of an object type "style."

Schema map 240 can define how various elements of schemas 235 for data sources 230 map to various elements of ontology 250. Definition component 210 receives, calculates, extracts, or otherwise identifies schemas 235 for data sources 230. Schemas 235 define the structure of data sources 230—for example, the names and other characteristics of tables, files, columns, fields, properties, and so forth. Definition component 210 furthermore optionally identifies sample data 236 from data sources 230. Definition component 210 can further identify object type, relationship, and property definitions from ontology 250, if any already exist. Definition component 210 can further identify pre-existing mappings from schema map 240, if such mappings exist.

Transformation component 220 can be invoked after schema map 140 and ontology 250 have been defined or redefined. Transformation component 220 identifies schema map 240 and ontology 250. Transformation component 120 further reads data sources 230 and identifies schemas 235 for data sources 230. For each element of ontology 250 described in schema map 240, transformation component 220 iterates through some or all of the data items of data sources 230, generating elements of object model 260 in the manner specified by schema map 240. In some embodiments, transformation component 220 can store a representation of each generated element of object model 260 in a database 270. In some embodiments, transformation component 220 is further configured to synchronize changes in object model 160 back to data sources 230.

Data sources 230 can be one or more sources of data, including, without limitation, spreadsheet files, databases, email folders, document collections, media collections, contact directories, and so forth. Data sources 230 can include structured data (e.g., a database, a .csv file, or any tab delimited or fixed-width file), semi-structured data (e.g., an email, an email server, or forms such as a suspicious activity report or currency transaction report), or unstructured data (e.g., encoded files such as PDF, sound, and image files). Data sources 230 can include data structures stored persistently in non-volatile memory. Data sources 230 can also or instead include temporary data structures generated from underlying data sources via data extraction components, such as a result set returned from a database server executing an database query.

Schema map 240, ontology 250, and schemas 235 can be stored in any suitable data structures, such as XML files, database tables, and so forth. In some embodiments, ontology 250 is maintained persistently. Schema map 240 can or cannot be maintained persistently, depending on whether the transformation process is perpetual or a one-time event. Schemas 235 need not be maintained in persistent memory, but can be cached for optimization.

Object model 260 comprises collections of elements such as typed objects, properties, and relationships. The collections can be structured in any suitable manner. In some embodiments, a database 270 stores the elements of object model 260, or representations thereof. In some embodiments, the elements of object model 260 are stored within database 270 in a different underlying format, such as in a series of object, property, and relationship tables in a relational database Based on the identified information, definition component 210 can generate a graphical interface 215. Graphical interface 215 can be presented to users of a computing device via any suitable output mechanism (e.g., a display screen, an image projection, etc.), and can further accept input from users of the computing device via any suitable input mechanism (e.g., a keyboard, a mouse, a touch screen interface). Graphical interface 215 may feature a visual workspace that visually depicts representations of the elements of ontology 250 for which mappings are defined in schema map 240. Graphical interface 215 can further utilize the sample data 236 to provide the user with a preview of object model 260 as the user defines schema map 240. In response to the input via the various controls of graphical interface 215, definition component 210 can generate and/or modify ontology 250 and schema map 240, and/or identify object models and sample data schemas 235 and data sources 230.

In some embodiments, graphical interface 215 also provides a user with the ability to add structure to an unstructured document stored in data sources 230 by tagging one or more portions (e.g., text) within the document. Defining tags and applying these tags to a portion of the document can create tag objects, properties, or links creating a relationship between one or more tag objects and/or properties. In some embodiments, graphical interface 215 allows a user to input one or more pre-defined tags to retrieve a tagged document, and/or a set of related documents that are associated with other pre-defined tags which are different from, but have a relationship to, the one or more input pre-defined tags. In some embodiments, graphical interface 215 also displays to the user the tags associated with those related documents, and the user can use those tags to identify another tagged documents, and/or another set of related documents, thereby allowing the user to "move" between the documents stored in data sources 230 guided by the relationships between the pre-defined tags.

Figure 3:
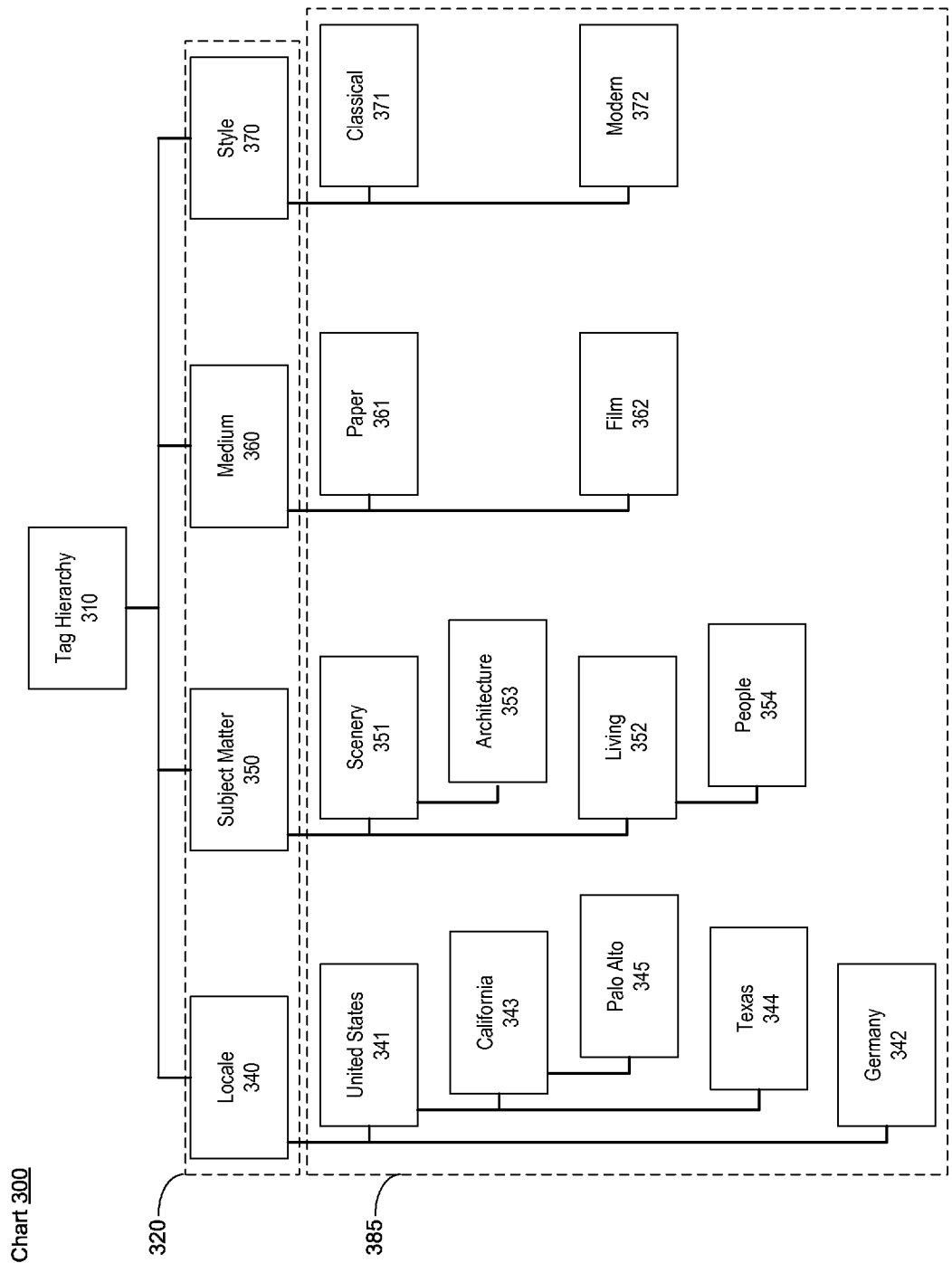
FIG. 3 is a chart illustrating an exemplary hierarchical structure of tags, consistent with embodiments of the present disclosure.

FIG. 3 is a chart 300 illustrating an exemplary hierarchical structure of tags 310 ("tag hierarchy"), consistent with embodiments of the present disclosure. In some embodiments, the exemplary tag hierarchy in FIG. 3 can provide part of the structure of object model 260 stored within database 270 in FIG. 2. Tag hierarchy 310 can include dimensions 320. For example, as shown in tag hierarchy 310, these dimensions include a locale dimension 340, a subject matter dimension 350, a medium dimension 360, and a style dimension 370. Each dimension includes a set of tags, which includes one or more tags linked to that dimension. In some embodiments, tags are created as objects with attributes, and these links can be established based on the attributes of the tags. The tags constitute a group of tags 330.

As shown in FIG. 3, locale dimension 340 can include a set of tags having attributes related to regions and countries. As an exemplary illustration, under the locale dimension 340, there is a United States tag 341 and a Germany tag 342. There can also be a further subset of tags (e.g., California tag 343 and Texas tag 344) under United States tag 341, where California tag 343 and Texas tag 344 have attributes indicating that they are associated with United States (e.g. being a state of the United States), which can allow California tag 343 and Texas tag 344 to be linked to United States tag 341. Similarly, California tag 343 can also have a further subset of tags (e.g. Palo Alto tag 345).

The relationship between a tag and any corresponding subset of tags can be based on attributes in that tag and in the corresponding subset of tags. For example, Palo Alto tag 345 has attributes indicating that it is associated with California (e.g., a city of the state of California), which can allow Palo Alto tag 345 to be linked to California tag 343.

Under tag hierarchy 310, subject matter dimension 350 can include tags with attributes related to a classification based on content. As an exemplary illustration, under subject matter dimension 350, there are scenery tag 351 and living tag 352, where scenery tag 351 has attributes indicating that the content is related to scenery (e.g. depicting or describing a scene), while living tag 352 has attributes indicating that the content is related to a living thing (e.g. depicting or describing a living organism, such as human). Scenery tag 351 can have a further subset of tags (e.g. architecture tag 353), where architecture tag 353 has attributes indicating that the content is related to architecture (e.g. depicting or describing buildings), which can allow architecture tag 353 to be linked with scenery tag 351. Similarly, living tag 352 can have a further subset of tags (e.g. people tag 354), where people tag 354 has attributes indicating that the content is related to a human (e.g. a portrait), which can allow tag 354 to be linked with living tag 352.

Under tag hierarchy 310, medium dimension 360 can include tags with attributes related to a classification based on a medium on which the content is rendered. As an exemplary illustration, there are paper tag 361 and film tag 362 under medium dimension 360. Furthermore, style dimension 370 can also include tags with attributes related to a classification based on a style of rendering the content. As an exemplary illustration, there are classical tag 371 and modern tag 372 under the style dimension 370. A person with ordinary skill in the art will understand that the dimensions and tags depicted in FIG. 3 are for illustration purposes only, and there is no limitation on the number of dimensions, how dimensions are defined, and how the tags are organized under each dimension.

Figure 4A:
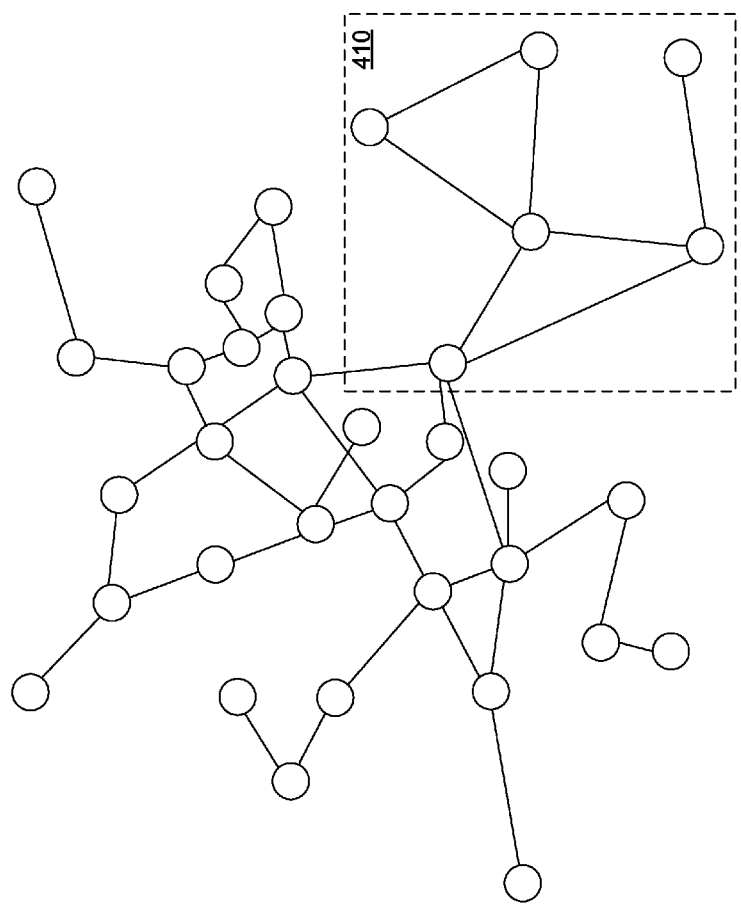
FIGS. 4A-4B are charts illustrating an exemplary object model reflecting relationships between tags, consistent with embodiments of the present disclosure.

FIG. 4A shows, in a chart 400, an exemplary object model reflecting relationships between tags, consistent with embodiments of the present disclosure. In chart 400, each circle represents a cell, and each line represents a relationship between cells. In some embodiments, a cell within the object model can be associated with one or more pre-defined tags, and the relationship between the cells can be defined based on a relationship between the attributes of the tags associated with the cells. Each of the cells can also be associated with the tagged documents stored in data sources 230 of FIG. 2 via, for example, common tags or related tags associated with both the cells and the tagged documents. A document can also be associated with one or more of the cells, if the document is tagged with multiple sets of tags that are associated with multiple cells.

Figure 4B:
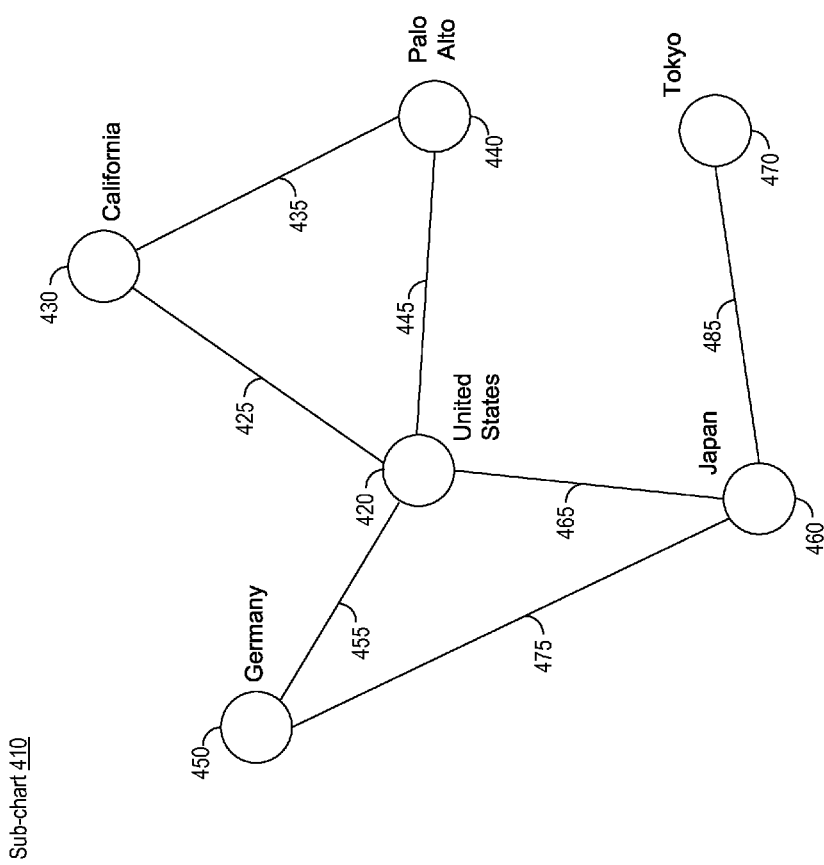

Chart 400 also includes a sub-chart 410 which includes an exemplary subset of cells and relationships of the object model. FIG. 4B shows a close-up view of sub-chart 410. Sub-chart 410 illustrates cells 420, 430, 440, 450, 460, and 470, as well as relationships 425, 435, 445, 455, 465, 475, and 485. As an exemplary illustration, cell 420 can be associated with United States tag 341, cell 430 can be associated with California tag 343, cell 440 can be associated with Palo Alto tag 345, cell 450 can be associated with Germany tag 342, cell 460 can be associated with a Japan tag (not shown in tag hierarchy 310 of FIG. 3), and cell 470 can be associated with a Tokyo tag (not shown in tag hierarchy 310 of FIG. 3). Among these cells, cell 420 (with the United States tag), cell 450 (with the Germany tag), and cell 460 (with the Japan tag) can have relationship 455, 465, and 475 between each other by virtue of, for example, that the United States tag, the Germany tag, and the Japan tag all have attributes related to an indication of a country with a developed economy.

Cell 430 (with the California tag) has relationship 425 with cell 420 (with the United States tag) by virtue of, for example, that the California tag has attributes that link it to United States tag 341 (e.g. California being a state of United States), the link to which can allow the California tag to be related to the United States tag. Furthermore, cell 440 (with the Palo Alto tag) can also have relationship 435 with cell 430 by virtue of, for example, that the Palo Alto tag includes attributes that link it to California tag 343 (e.g. Palo Alto being a city of California), the link to which can allow the Palo Alto tag to be related to the California tag. Palo Alto tag 345 can also include attributes that link it to United States tag 341 (e.g. Palo Alto being a city of United States), the link to which can allow cell 440 to also have the relationship 445 with cell 420.

On the other hand, cell 460 (with the Japan tag) can have a relationship 485 with cell 470 (with the Tokyo tag) by virtue of, for example, that the Tokyo tag has attributes that link it to the Japan tag (e.g. Tokyo being a city of Japan), the link to which can allow the Tokyo tag to be related to the Japan tag. But in this exemplary illustration, the Tokyo tag may have no relationship with the Germany tag, the United States tag, the California tag, or the Palo Alto tag, therefore cell 470 may have no relationship with cells 420, 430, 440, or 450 within sub-chart 410.

Figure 5:
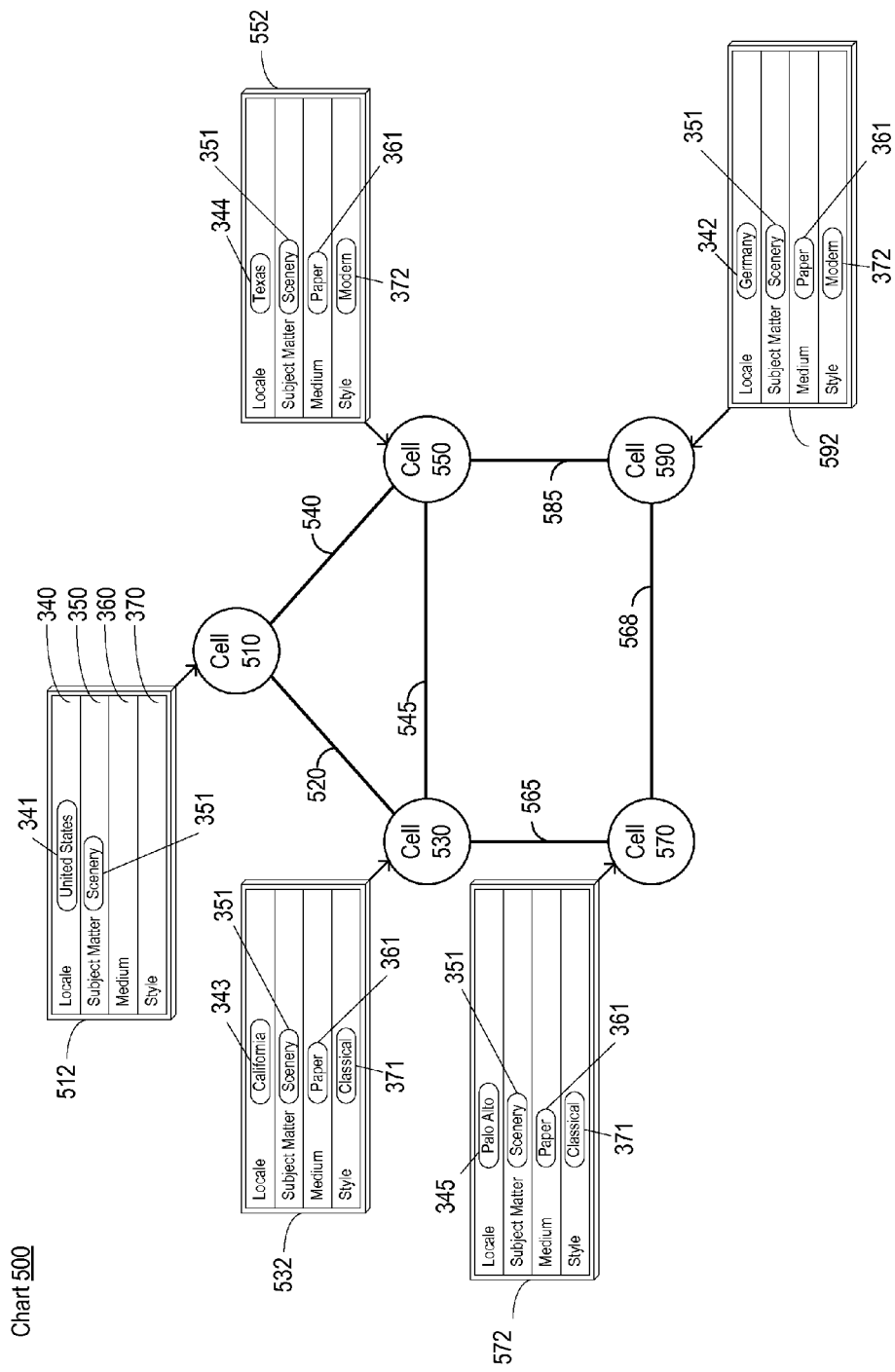
FIG. 5 is a chart illustrating an exemplary object model reflecting relationships between combinations of tags of the exemplary hierarchical structure of tags depicted in FIG. 3, consistent with embodiments of the present disclosure.

FIG. 5 is a chart 500 illustrating an exemplary object model reflecting relationships between combinations of tags of the exemplary hierarchical structure of tags depicted in FIG. 3, consistent with embodiments of the present disclosure. In some embodiments, the object model shown in chart 500 includes cells 510, 530, 550, 570, and 590, each of which can be, respectively, associated with tag combinations 512, 532, 552, 572, and 592. Each tag combination includes one or more tags for each of its dimensions, which include, for example, locale dimension 340, subject matter dimension 350, medium dimension 360, and style dimension 370 as depicted in FIG. 3. The tag combination can include tags of tag hierarchy 310 as depicted in FIG. 3, and can include one or more tags for each dimension as depicted in FIG. 3. Each of these cells can also be associated with the tagged documents stored in data sources 230 of FIG. 2 via the tags. The object model shown in chart 500 also includes relationships 520, 540, 545, 565, 568, and 585 between the cells. As to be illustrated below, these relationships can be determined based on the relationship between tags within one or more dimensions.

As an exemplary illustration, cell 510 is associated with tag combination 512, which includes United States tag 341 under the locale dimension and scenery tag 351 under the subject matter dimension. Cell 530 is associated with tag combination 532, which includes California tag 343 under the locale dimension, scenery tag 351 under the subject matter dimension, paper tag 361 under the medium dimension, and classical tag 371 under the style dimension. Cell 570 is associated with tag combination 572. Tag combination 572 is otherwise identical to tag combination 532 except that tag combination 572 has Palo Alto tag 345 instead of California tag 343 under the locale dimension. Moreover, cell 550 is associated with tag combination 552, which includes Texas tag 344 under the locale dimension, scenery tag 351 under the subject matter dimension, paper tag 361 under the medium dimension, and modern tag 372 under the style dimension. Lastly, cell 590 is associated with tag combination 592. Tag combination 592 is otherwise identical to tag combination 552, except that tag combination 592 has Germany tag 342 instead of Texas tag 344 under the locale dimension.

Relationship 520 between cell 510 and cell 530 can be determined based on, for example, a relationship between the United States tag (associated with cell 510) and the California tag (associated with cell 530) under the locale dimension. A relationship 540 between cell 510 and cell 550 can also be determined based on, for example, a relationship between the Texas tag (associated with cell 550) and the United States tag under the locale dimension. Furthermore, relationship 545 between cell 530 and cell 550 can also be determined based on, for example, both the relationship between the California tag and the Texas tag under the locale dimension, as well as the relationship between the paper tag (associated with cell 530) and the film tag (associated with cell 550) under the medium dimension. In this particular example, because both cells 510 and 530 have scenery tag 351 for the subject matter dimension, the subject matter dimension can be ignored in determining relationship 520.

Also, because cell 510 does not have tags for the medium and style dimensions, these dimensions can also be ignored in determining relationships 520 and 540.

As discussed before, the relationship between tags can be determined based, for example, the attributes of the tags. In addition, relationship between tags can also be established in other ways. For example, tags can become related to each other when both tags are associated with a document, with documents that have related metadata, or with a cell. Furthermore, relationship between tags can also be created manually according to any pre-defined condition.

In some embodiments, each tag combination in FIG. 5 can be represented as a multi-dimensional vector, with each dimension of tag hierarchy 310 represented by a vector dimension, and a combination of one or more tags under a dimension of tag hierarchy 310 contributes to a magnitude of the vector along that vector dimension, based on the attributes of the tags. The relationship between tags can then be calculated as, for example, an imaginary distance between the multi-dimensional vectors representing the tag combinations. In some embodiments, such imaginary distance can be calculated by first projecting the multi-dimensional vectors representing the tag combinations onto a pre-defined plane, and then calculating a distance between the projections on the pre-defined plane. In some embodiments, when the calculated distance exceeds a certain threshold, it can be determined that no relationship exists between the tag combinations. In some embodiments, the relationship between cells (or between tag combinations associated with the cells) can also be added manually with or without considering the calculated distance.

Referring back to FIG. 5, cell 570 is associated with tag combination 572, which includes Palo Alto tag 345 under the locale dimension, and the locale dimension is the only dimension with different tags when compared with tag combination 532 associated with cell 530. Relationship 565 can then be determined based on, for example, the relationship between California tag 343 and Palo Alto tag 345 under the locale dimension alone. Similarly, cell 590 is associated with tag combination 592, which includes Germany tag 342 under the locale dimension, and the locale dimension is the only dimension with different tags when compared with the tag combination 552 associated with cell 550. Relationship 585 can then be determined based on, for example, the relationship between Germany tag 342 and Texas tag 344 under the locale dimension alone.

Relationship 568 between cells 570 and 590 can also be determined based on, for example, both the relationship between the Palo Alto tag (associated with cell 570) and the Germany tag (associated with cell 590) under the locale dimension, as well as the relationship between the classical tag (associated with cell 570) and the modern tag (associated with cell 590) under the medium dimension. In some embodiments, as discussed above, each of the cells in object model 500 can be associated with documents stored in data sources 230 that are tagged with the same tags associated with each cell, and relationship 568 can be established by, for example, that a document stored in data sources 230 describes a Germany film derived from a Palo Alto novel, and therefore is tagged with tags including, for example, Germany tag 342, Palo Alto tag 345, paper tag 361, and film tag 362, etc., notwithstanding any calculated distance between these tags.

Figure 6A:
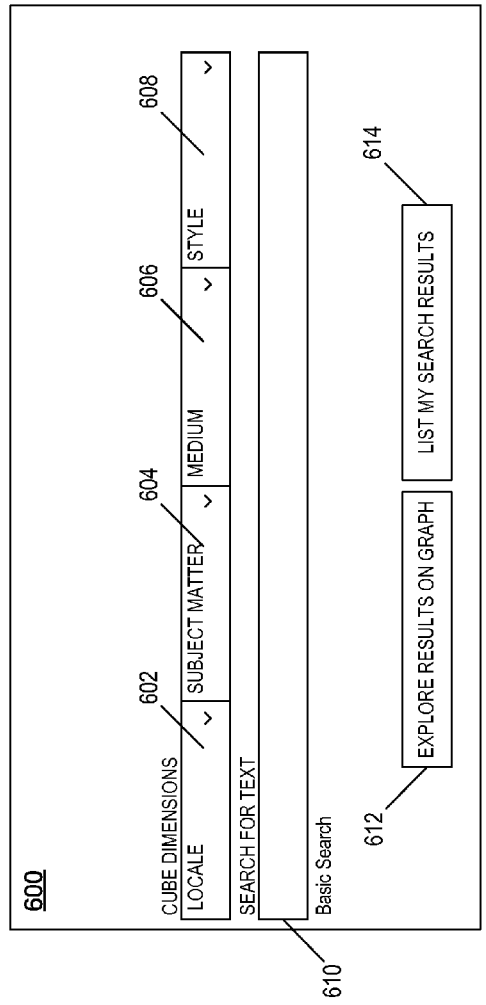
FIGS. 6A-6B are screenshots depicting an exemplary interface for selecting one or more tags to identify a document, consistent with embodiments of the present disclosure.
Figure 6B:
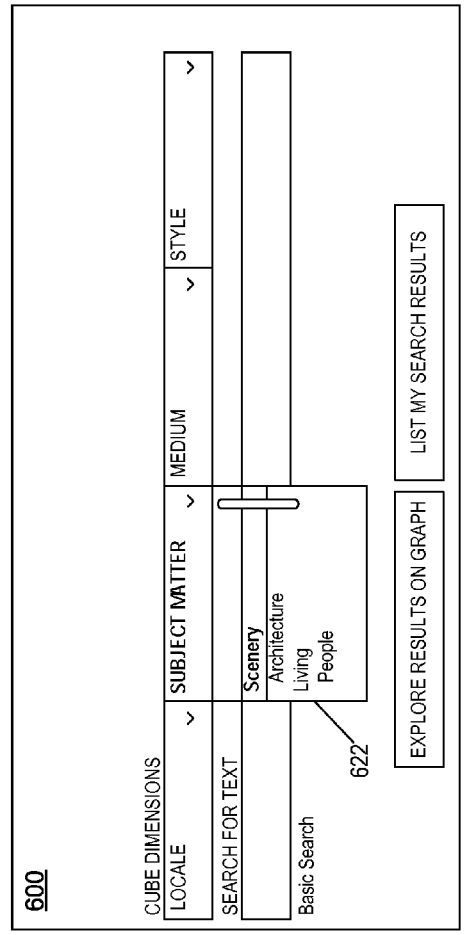

FIG. 6A and FIG. 6B are screenshots depicting an exemplary interface 600 for selecting one or more tags to identify a document, consistent with embodiments of the present disclosure. In some embodiments, the exemplary interface can be provided by an application. The application can be a web browser such as, for example, Google™ Chrome™, Mozilla™ Firefox™, Microsoft™ Internet Explorer™, etc.

In some embodiments, a bookmarklet is installed in the web browser. A bookmarklet can be a bookmark that is stored in a web browser and can contain JavaScript™ commands to extend the web browser's functionality. That is, a bookmarklet can be a simple "one-click" tool that can add functionality to the web browser. For example, a bookmarklet can modify the appearance of a web page within the web browser by changing the font size or the background color of the text, and/or extract data from a web page.

In some embodiments, a plug-in, instead of a bookmarklet, can be installed. A plug-in can be implemented as a set of software components that adds specific abilities to a larger software application, like a web browser, to enable customizing the functionality of the software application. For example, a plug-in can be installed in a web browser to enable the web browser to play video.

In some embodiments, the exemplary interface can be provided by a client-side application. All the exemplary interfaces discussed below can take in any form, such as being displayed as a pop-up window.

Referring back to FIG. 6A, interface 600 includes a locale field 602 for the locale dimension, a subject matter field 604 for the subject matter dimension, a medium field 606 for the medium dimension, and a style field 608 for the style dimension. Each of these fields can receive one or more tags as input to identify one or more relevant documents through interface 600, and can also display one or more tags as output through interface 600.

Fields 602, 604, 606, and 608 can receive input via any means. For example, interface 600 can allow a user to type in the tags or, in some embodiments as shown in FIG. 6B, further provides a pull-down menu 622 from which the user can choose one or more tags. In some embodiments, the field can also receive an incomplete text input, and then provide a list of suggested tags for the user to choose from. The list of suggested tags may include pre-defined tags that closely match the incomplete text input. In some embodiments, instead of providing a field for each dimension, interface 600 can provide a single field for tag selection for all dimensions, and the user can either type in a combination of tags into the single field, or select the tags from a pull-down menu provided by the single field.

In some embodiments, a search field 610 is also provided, allowing the user to search for documents based on text, rather than tags. After receiving the tags or the search text input, user interface 600 corresponds with object model 260 and/or database 270 to search for or identify the documents. In some embodiments, the user is provided an option to select, by clicking on button 612, to explore the result presented in a graphical map similar to chart 400 of FIG. 4A, where the graphical map can show one or more icons with links between them. In some embodiments, each icon in the graphical map represents a document and is selectable, and a selection of the icon can trigger a selection and a display of the document represented by the icon, while the link represents relationships between the tags associated with the documents represented by the icons.

In some embodiments, the user is provided an option to select, by clicking on button 614, to list the search result. The listing of search result will be discussed later.

Figure 7A:
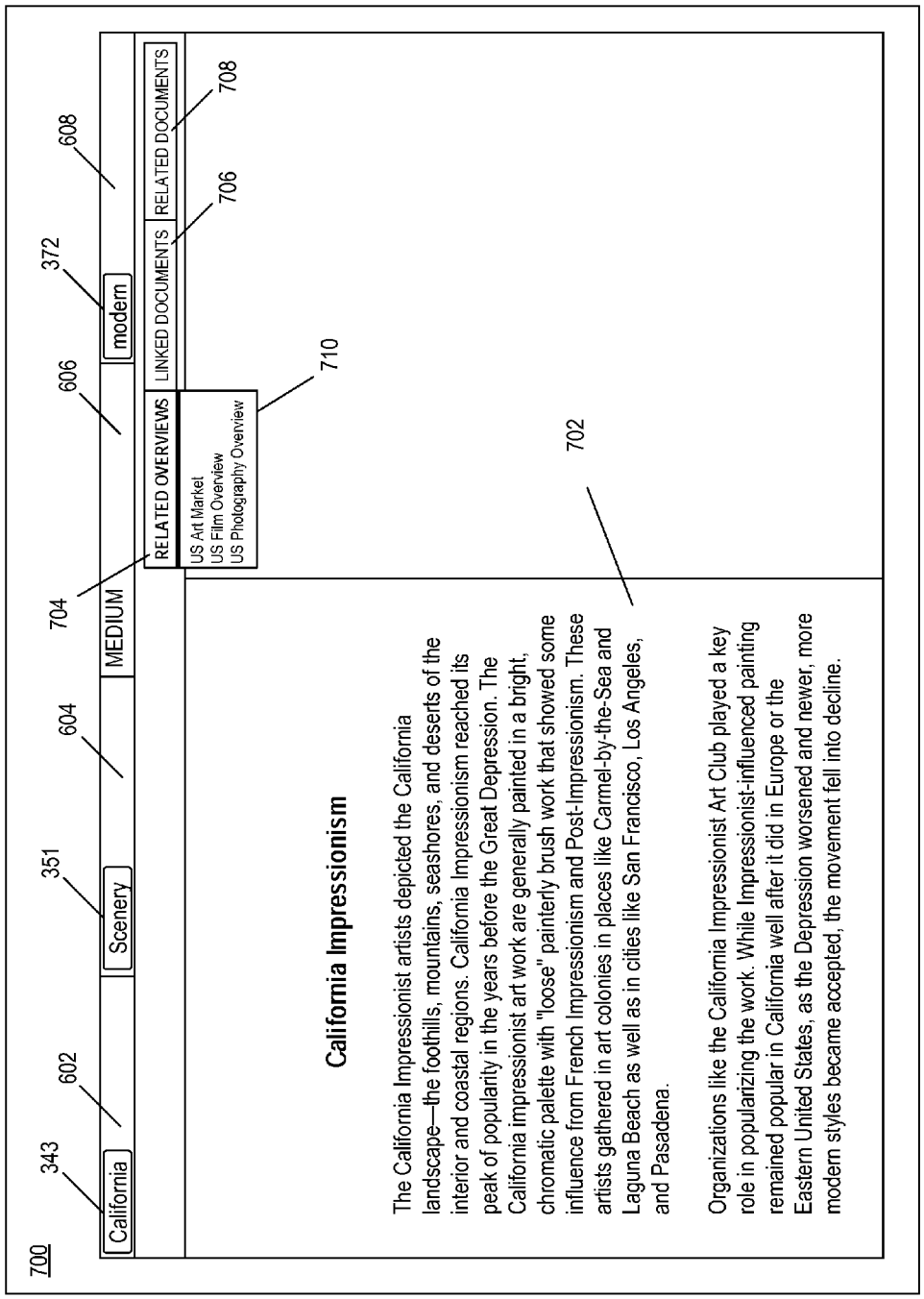
FIGS. 7A-7E are screenshots depicting exemplary interfaces for identifying and displaying documents based on tags, consistent with embodiments of the present disclosure.

FIG. 7A is a screenshot depicting an exemplary interface 700 for identifying and displaying documents based on tags, consistent with embodiments of the present disclosure. Based on one or more tags received in, for example, interface 600 of FIG. 6A, one or more documents (in this case, document 702) can be identified and displayed by virtue of the fact that, for example, document 702 is associated with a cell that is associated with the received tags.

Interface 700 may include fields 602, 604, 606, and 608 of interface 600 to display the tags received. In this exemplary illustration, California tag 343 is input under the locale dimension with field 602, scenery tag 351 is input under the subject matter dimension with field 604, and modern tag 372 is input under the style dimension with field 608, while no tag is input for the medium dimension. Document 702 titled "California Impressionism" can then be identified and displayed through interface 700 in response to the California tag, the scenery tag, and the modern tag input by virtue of, for example, document 702 being associated with a cell that is associated with these tags.

In some embodiments, interface 700 can also provide a means to access other documents related to document 702 or related to the tags selected. As shown in FIG. 7A, interface 700 provides a related-overview button 704, a linked-documents button 706, and a related-documents button 708.

Figure 7B:
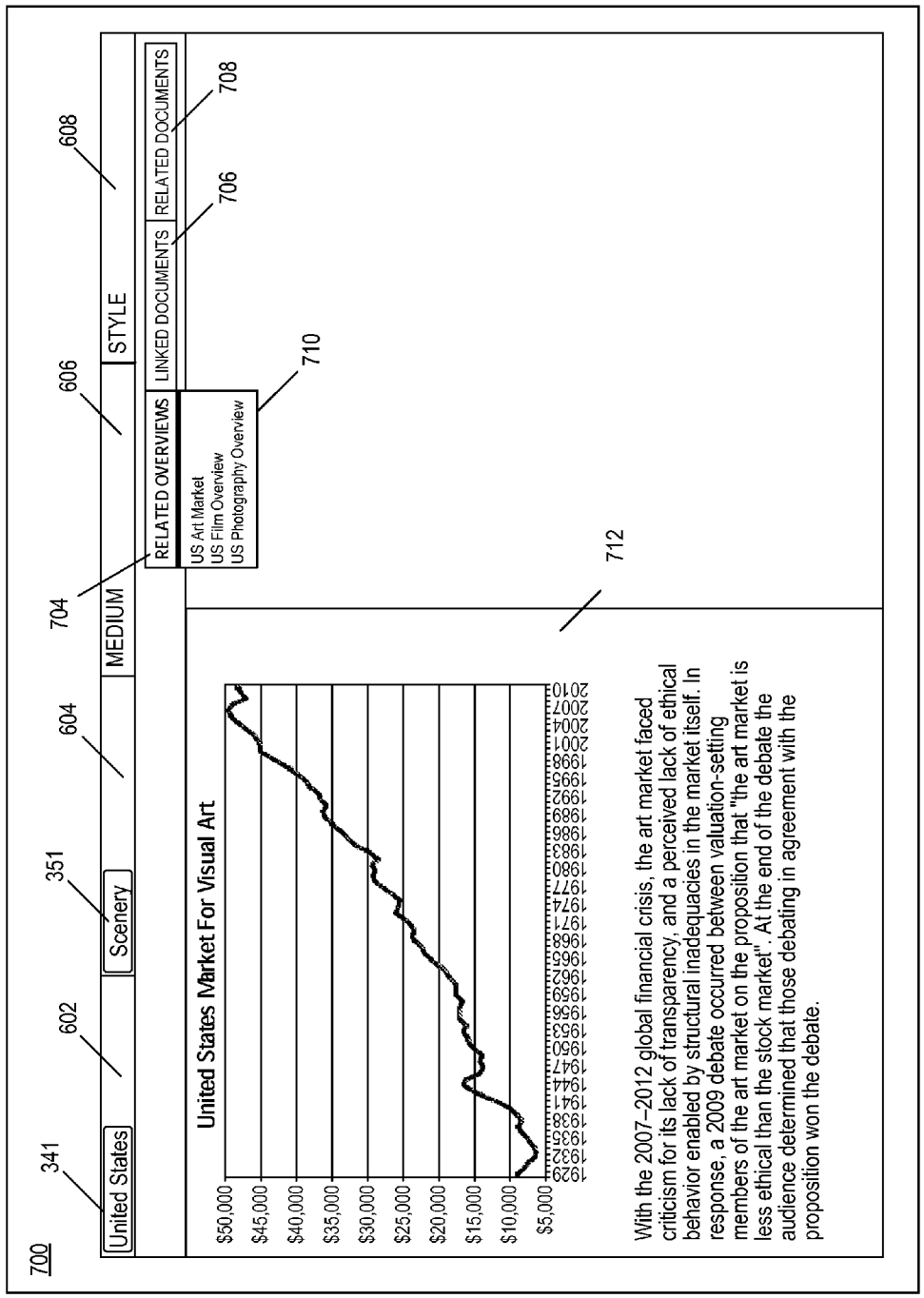

In an exemplary illustration, after clicking on the related-overviews button, a pull-down menu 710 can be displayed, which includes options including US art market, US film overview, and US photography overview. FIG. 7B is a screenshot depicting that a document 712 titled "United States Art Market" is identified and displayed when the "US Art Market option" of pull-down menu 710 is selected. As shown in FIG. 7B, document 712 is associated with United States tag 341, which is a hierarchical superset of California tag 343, and scenery tag 351. The related-overviews option can allow the user to identify documents that are relatively more closely related to document 702 of FIG. 7A. The closer relationship can be determined base on, for example, that document 712 is associated with a tag (United States tag 341) that is within the same dimension (locale dimension 340) as one of the tags associated with document 702 (California tag 343), or that a distance between documents 702 and 712 is below a certain threshold, as indicated by the fact that they are both associated with scenery tag 351.

Figure 7C:
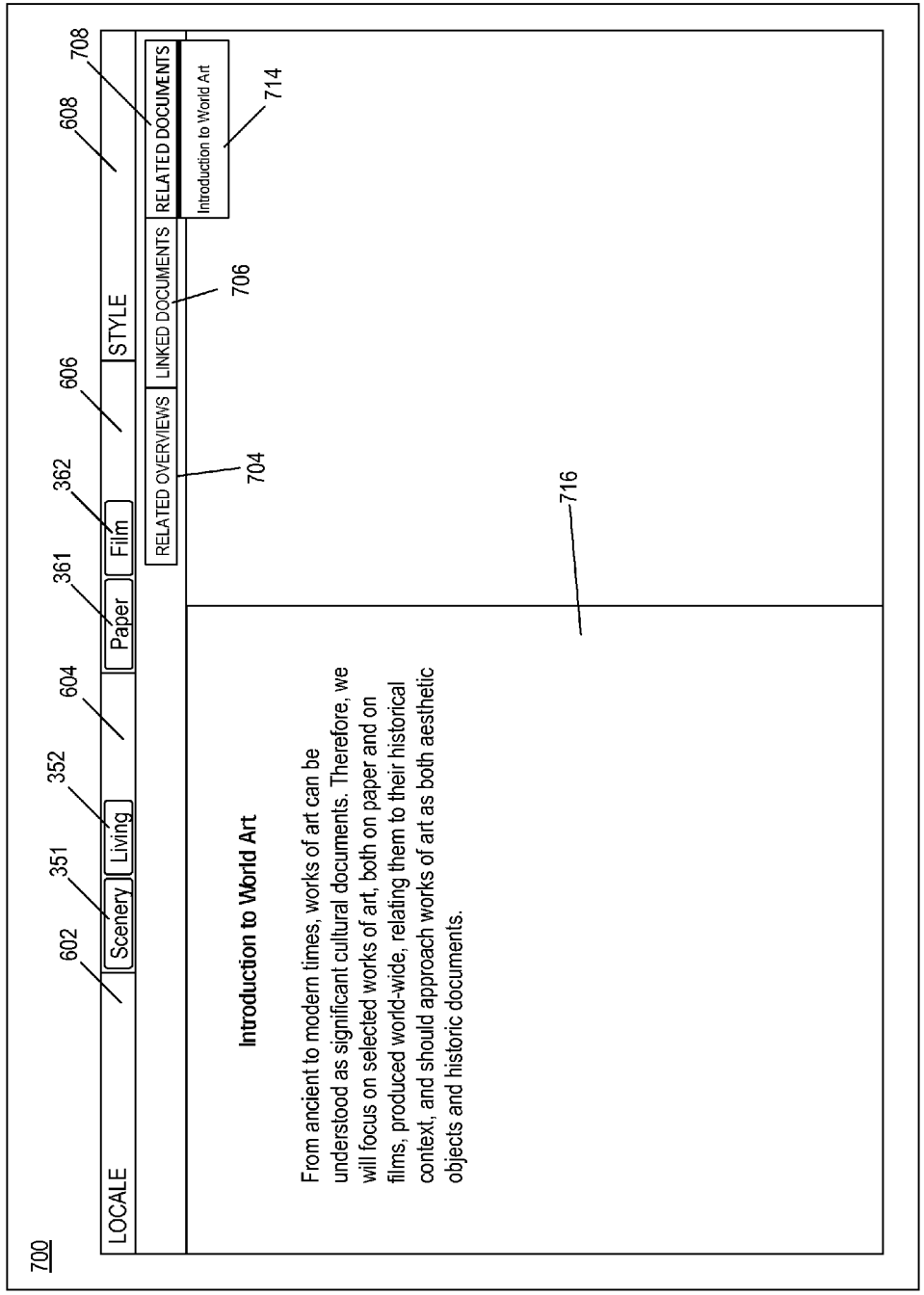

In another exemplary illustration, as shown in FIG. 7C, after clicking on the related-documents button 708, a pull-down menu 714 can be displayed, which includes an option "Introduction to World Art." In some embodiments, related-documents button 708 can also provide access to documents that are more broadly related to document 702 of FIG. 7A. For example, as shown in FIG. 7C, a document 716 titled "Introduction to World Art" is identified and displayed when the "Introduction to World Art" option of pull-down menu 714 is selected. As shown in FIG. 7C, document 716 is associated with scenery tag 351 and living tag 352 under the subject matter dimension, and is also associated with paper tag 361 and film tag 362 under the style dimension. Document 716 can be determined to be more broadly related to document 702 of FIG. 7A based on, for example, that while documents 716 and 702 are both associated with scenery tag 351 under the subject matter dimension, document 716 is associated with tags that are not associated with document 702 within the same dimension (e.g., living tag 352). The determination can also be based on that document 716 is associated with one or more tags of a specific dimension, while document 702 is not associated with any tag from that specific dimension (e.g., paper tag 361 and film tag 362 of the medium dimension). Therefore, related-documents button 708 allows a user to access documents across more dimensions and tags than related-overview button 704.

Figure 7D:
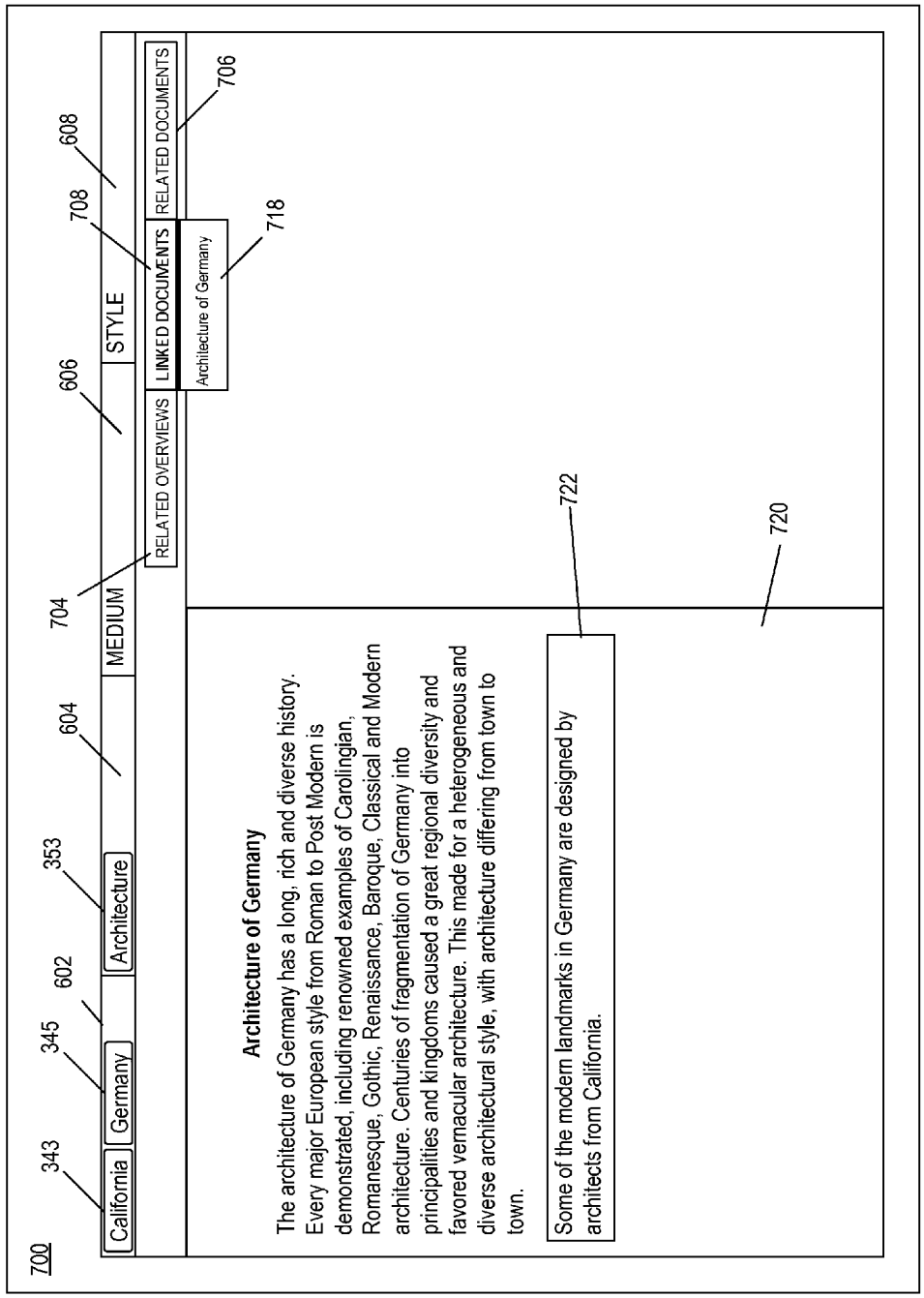

In another exemplary illustration, as shown in FIG. 7D, after clicking on the linked-documents button, a pull-down menu 718 can be displayed. In some embodiments, linked documents button 708 can provide access to documents associated with tags that have a lateral relationship with the tags selected. For example, referring to FIG. 3, the California tag 343 and the Germany tag 342 can be lateral to each other within tag hierarchy 310.

According to FIG. 7D, a document 720 titled "Architecture of Germany" is identified and displayed, when Architecture of Germany option of pull-down menu 718 is selected. As shown in FIG. 7D, document 720 is associated with Germany tag 342 and architecture tag 353. In this example, document 720 also has a California tag 343 because document 720 discusses about some of the landmarks in Germany are designed by architects from California, as shown in paragraph 722. The linked-documents option thus can also allow the user to identify documents associated with at least a tag (e.g. Germany tag 342) that has a lateral relationship with any one of the selected tags (e.g. California tag 343).

Figure 7E:
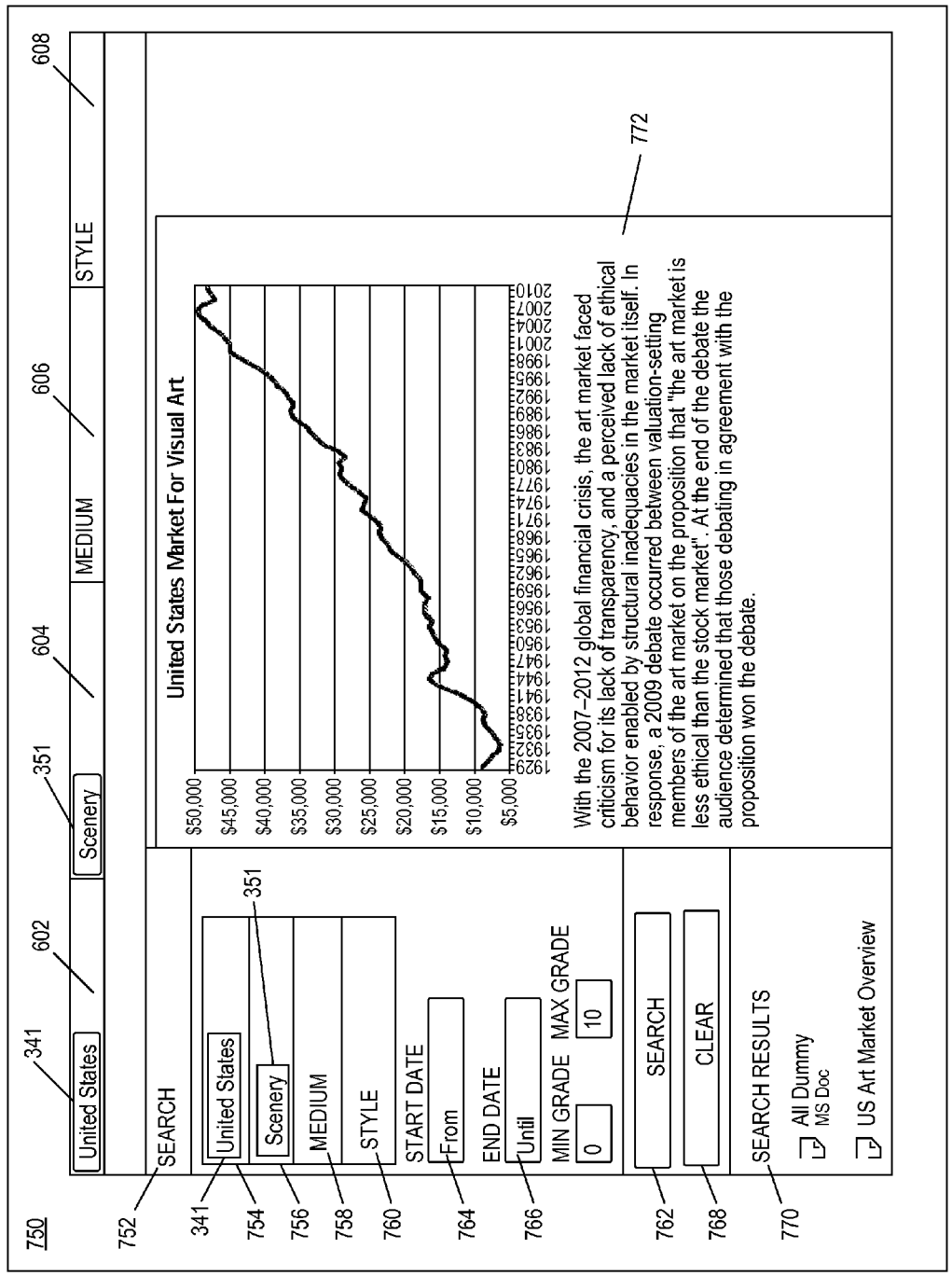

FIG. 7E is a screenshot depicting an exemplary interface 750 for identifying and displaying documents based on tags, consistent with embodiments of the present disclosure. Interface 750 includes a search interface 752 which can allow a search and display of one or more documents based on tags. In some embodiments, search interface 752 can be activated by, for example, clicking on button 614 of interface 600 as depicted in FIG. 6A to list the search result. In some embodiments, search interface 752 includes a locale field 754 for the locale dimension, a subject matter field 756 for the subject matter dimension, a medium field 758 for the medium dimension, and an style field 760 for the style dimension, which can allow the user to specify tags under each dimension for the search. In some embodiments, interface 750 may further include fields 602, 604, 606, and 608 of interface 600, and the fields 754, 756, 758, and 760 of the search interface 752 can be synchronized with, respectively, fields 602, 604, 606, and 608. In this exemplary illustration, United States tag 341 is input for the locale dimension, and scenery tag 351 is input for the subject matter dimension. Both fields 754 and 756 of search interface 752 can then display the same tags as, respectively, fields 602 and 604 of interface 750. A search for documents that are associated with a combination of tags input through fields 754, 756, 758, and 760 can then be performed, after clicking on the "search" button 762. The search interface 752 may also allow the user to provide additional search conditions, such as limiting to the search result to, for example, a start date and an end date provided through input fields 764 and 766. The user can clear the search conditions (e.g. tags and start/end date) by clicking on the "clear" button 768. After the search is performed, search result 770 is displayed. In this exemplary embodiment, search result 770 displays metadata such as the file type and the title of the documents found. The user can also select a document from the search result 770, which can lead to the displaying of document 772.

Figure 8A:
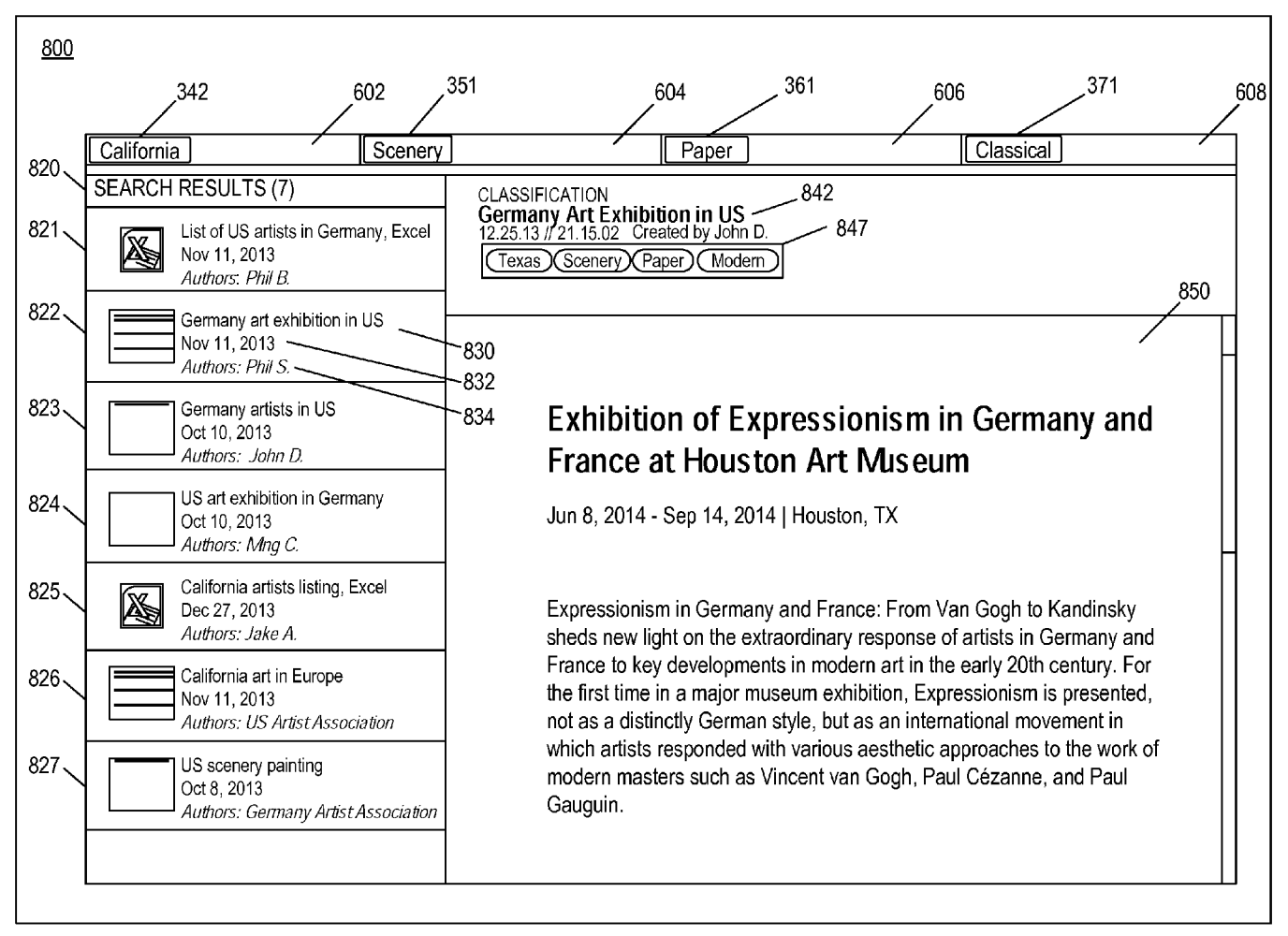

FIG. 8A is a screenshot depicting an exemplary interface 800 for identifying and displaying documents based on tags from previously identified documents, consistent with embodiments of the present disclosure. Interface 800 includes fields 602-608 of interface 600. In this example, United States tag 341 is input for the locale dimension with field 602, scenery tag 351 is input for the subject matter dimension with field 604, paper tag 361 is input for the medium dimension with field 606, and classical tag 371 is input for the style dimension with field 608. Thus, in this illustration, a tag combination identical to tag combination 532 of FIG. 5 is input for the search. Interface 800 also includes a search results interface 820, which displays search results 821-827. Search results 821-827 can show a list of, for example, documents that are found based on the selected tags, with metadata for each document, such as title 830, date 832, and author 834. Each of the documents in the search results can be selected, with additional information of the selected document displayed, such as classification 842, and tag combination 847.

In this exemplary illustration, a document titled "Exhibition of Expressionism in Germany and France at Houston Art Museum" is chosen, and is displayed as document 850. Selected document 850 is tagged with, for example, tag combination 847, which is identical to tag combination 552 of FIG. 5, and which includes Texas tag 344, scenery tag 351, paper tag 361, and modern tag 372. Referring to FIG. 5, selected document 850 can be associated with cell 550, by virtue of having tag combination 847 which is identical to tag combination 552, and cell 550 has relationship 545 with cell 530 that is associated with tag combination 532 which is identical to the tag combination input for this search. In some embodiments, interface 800 may also allow the user to add or modify the tags associated with the chosen document. For example, the user can remove classical tag 371 from the document, or tag the document with other tags under the style dimension.

Figure 8B:
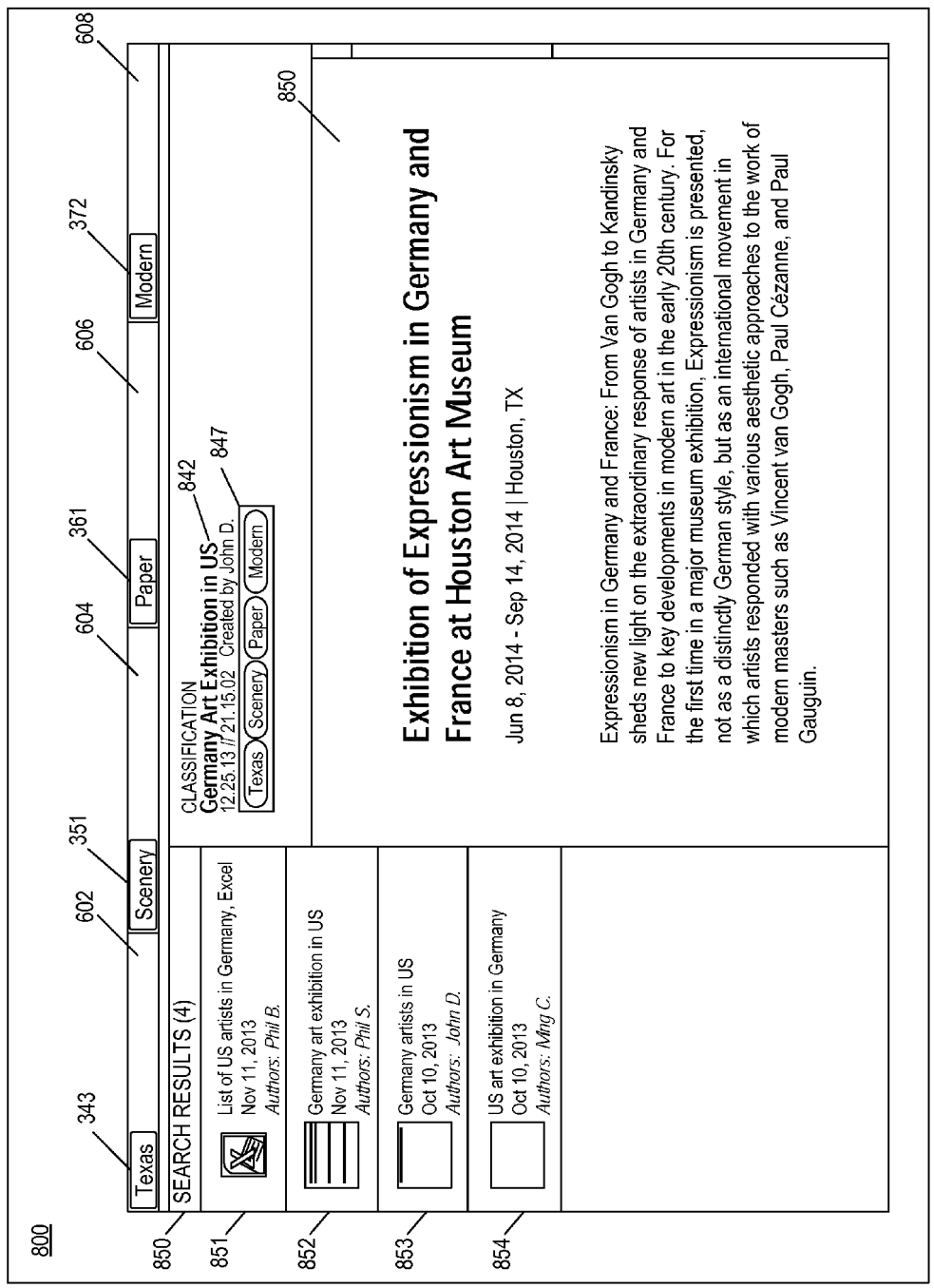

FIG. 8B is another screenshot depicting exemplary interface 800. After the selection of document 850, which is tagged with tag combination 847 (which is identical to tag combination 552), fields 602-608 can be populated with the tags of tag combination 847. In this exemplary illustration, the locale dimension, which has California tag 343 when the prior search is performed, can be populated with Texas tag 344 from selected document 850. Moreover, the style dimension, which has classical tag 371 when the prior search is performed, can be populated with modern tag 372, also from selected document 850. The user can then perform a new search, and an updated search results 850 is shown, which includes search results 851-854. Referring to FIG. 5, some of the documents in search result 850 may be associated with a cell that is related to cell 550 associated with tag combination 552 (which is identical to tag combination 847), such as cell 590, cell 510, and cell 530, etc. This can allow the user to begin with an initial group of tags to identify one or more documents related to the initial set of tags, and then receive additional or new sets of tags from the identified documents. The additional or new sets of tags can then be used to refine the user's exploration in the universe of documents stored in data sources 230, and the refinement can be guided by the predefined relationship between the tags, which can determine the set of related documents provided for a given set of tags.

Figure 9:
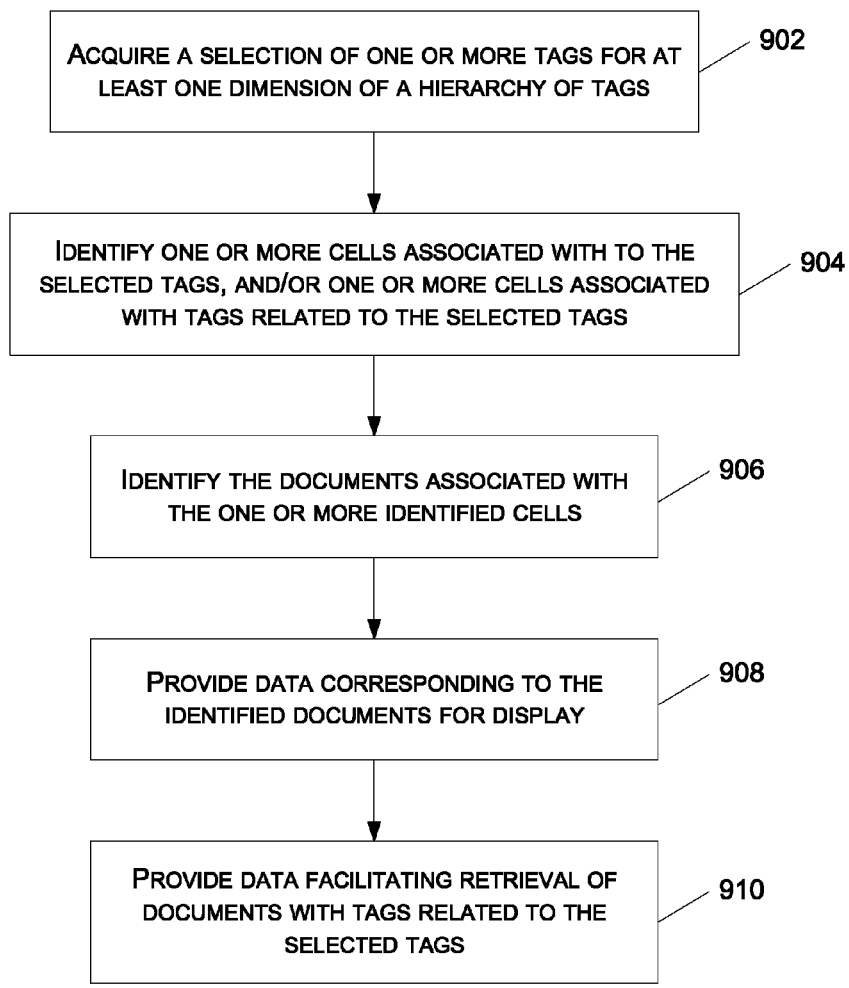
FIG. 9 is a flowchart representing an exemplary method performed by an electronic device for identifying documents based on tags, consistent with embodiments of the present disclosure.

FIG. 9 is a flowchart representing an exemplary method 900 performed by an electronic device for identifying documents based on selected tags, consistent with embodiments of the present disclosure. The selected tags can be part of a predefined tag hierarchy (e.g., tag hierarchy 310 of FIG. 3).

In this exemplary illustration, the electronic device (e.g., a computer system 100) can interact with one or more other devices and/or storage components (e.g., data sources 230, object model 260, and database 270 of system 200 depicted in FIG. 2) for assisting with the identification of documents. While the flowchart discloses the following steps in a particular order, it will be appreciated that at least some of the steps can be moved, modified, or deleted where appropriate, consistent with the teachings of the present disclosure. And while the following steps are indicated as being performed by an electronic device, it is appreciated that the steps can be performed by more than one electronic device.

In step 902, the electronic device acquires a selection of one or more tags for at least one dimension defined under the tag hierarchy. The selection can be provided by a web-browser, or by a client-side application, after receiving the selection from a user.

In step 904, after acquiring the tag selection, the electronic device identifies one or more cells that are associated with the selected tags, and/or one or more cells associated with tags related to the selected tags. As indicated above, these identified cells can be provided by an object model (e.g., object model 260). In some embodiments, the relationship can be determined based on the attributes of the tags. For example, if a cell has attributes that match the selected tags, that cell can be identified.

In some embodiments, a combination of tags of one or more dimensions within tag hierarchy 310 can be represented as a multi-dimensional vector, with each dimension of tag hierarchy 310 represented by a vector dimension, and a combination of one or more tags under a dimension of tag hierarchy 310 contributes to a magnitude of the vector along that vector dimension, based on the attributes of the tags. The relationship between tags can then be calculated as, for example, an imaginary distance between the multi-dimensional vectors representing the tag combinations. In some embodiments, such imaginary distance can be calculated by first projecting the multi-dimensional vectors representing the tag combinations onto a pre-defined plane, and then calculating a distance between the projections on the pre-defined plane. In some embodiments, when the calculated distance exceeds a certain threshold, it can be determined that no relationship exists between the tag combinations. In some embodiments, the relationship between cells (or between tag combinations associated with the cells) can also be added manually with or without considering the calculated distance.

In step 906, the electronic device identifies documents associated with the one or more identified cells. As indicated above, tagged documents are associated with cells.

In step 908, the electronic device provides data corresponding to the identified documents for display. The identified documents can be represented as a list similar to search results 820 depicted in FIG. 8A, or similar to a graphical representation as depicted in FIG. 4A.

In step 910, the electronic device further provides data facilitating retrieval of documents with tags related to the selected tags. The data can be provided and displayed after, for example, the electronic device detects the clicking of at least one of related overview button 704, a linked documents button 706, and a related documents button 708 of interface 700. The data facilitating retrieval of documents can be displayed in the same interface as the data for the identified documents. For example, interface 700 can further include a pop-up window that includes requested information.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed:

1. An apparatus comprising:
a memory device that stores a set of instructions; and
at least one processor configured to execute the set of instructions to:
communicate with one or more data storage devices storing a plurality of documents and an object model, wherein:
the object model comprises a plurality of cells and relationships among the plurality of cells,
each cell of the object model is associated with a respective combination of document tags, and
each of the documents is associated with at least one respective cell of the plurality of cells based on corresponding combinations of document tags associated with the respective documents;
determine relationships among the plurality of cells in the object model by at least:
representing each cell as a respective multi-dimensional vector based on the combination of document tags associated with the respective cells; and
determining an imaginary distance between the multi-dimensional vectors associated with each pair of cells of the plurality of cells;
receive, via a user interface, search criteria for searching the plurality of documents, wherein the search criteria include indications of one or more document tags;
responsive to receiving the search criteria:
determine a first cell of the plurality of cells of the object model matching the one or more document tags indicated by in the search criteria;
determine a second cell of the plurality of cells that is related to the first cell based on the object model; and
identify, from the data storage devices, at least one or more documents associated with the second cell; and
provide, for displaying in the user interface, indications of the one or more documents associated with the second cell.

2. A non-transitory computer readable medium that stores a set of instructions that are executable by at least one processor of an electronic device to cause the electronic device to perform a method comprising:
communicating with one or more data storage devices storing a plurality of documents and an object model, wherein:
the object model comprises a plurality of cells and relationships among the plurality of cells,
each cell of the object model is associated with a respective combination of document tags, and
each of the documents is associated with at least one respective cell of the plurality of cells based on corresponding combinations of document tags associated with the respective documents;
determining relationships among the plurality of cells in the object model by at least:
representing each cell as a respective multi-dimensional vector based on the combination of document tags associated with the respective cells; and
determining an imaginary distance between the multi-dimensional vectors associated with each pair of cells of the plurality of cells;
receiving, via a user interface, search criteria for searching the plurality of documents, wherein the search criteria include indications of one or more document tags;
responsive to receiving the search criteria:
determining a first cell of the plurality of cells of the object model matching the one or more document tags indicated by in the search criteria;
determining a second cell of the plurality of cells that is related to the first cell based on the object model; and
identifying, from the data storage devices, at least one or more documents associated with the second cell; and
providing, for displaying in the user interface, indication of the one or more documents associated with the second cell.

3. A computer-implemented method comprising:
communicating with one or more data storage devices storing a plurality of documents and an object model, wherein:
the object model comprises a plurality of cells and relationships among the plurality of cells,
each cell of the object model is associated with a respective combination of document tags, and
each of the documents is associated with at least one respective cell of the plurality of cells based on corresponding combinations of document tags associated with the respective documents;
determining relationships among the plurality of cells in the object model by at least:
representing each cell as a respective multi-dimensional vector based on the combination of document tags associated with the respective cells; and
determining an imaginary distance between the multi-dimensional vectors associated with each pair of cells of the plurality of cells;
receiving, via a user interface, search criteria for searching the plurality of documents, wherein the search criteria include indications of one or more document tags;
responsive to receiving the search criteria:
determining a first cell of the plurality of cells of the object model matching the one or more document tags indicated by in the search criteria;
determining a second cell of the plurality of cells that is related to the first cell based on the object model; and
identifying, from the data storage devices, at least one or more documents associated with the second cell; and
providing, for displaying in the user interface, indication of the one or more documents associated with the second cell.

4. The apparatus of claim 1, wherein the at least one processor is further configured to execute the set of instructions to:
identify, from the data storage devices, at least one or more documents associated with the first cell; and
provide, for displaying in the user interface, at least one of the one or more documents associated with the first cell.

5. The apparatus of claim 1, wherein the at least one processor is further configured to execute the set of instructions to:
  receive, via the user interface, a selection of a document from the one or more documents associated with the second cell; and
  responsive to the selection of the document, update the search criteria to include indications of one or more document tags associated with the document.

6. The apparatus of claim 1, wherein the document tags associated with the cells include multiple dimensions, and wherein the user interface provides an input selection field for each dimension or a single input selection field that can receive a combination of dimensions of document tags.

7. The apparatus of claim 1, wherein the user interface provides a drop down menu to display one or more document tags for selection.

8. The apparatus of claim 1, wherein the user interface displays a list of selectable items representing the one or more documents associated with the second cell, wherein each selectable item corresponds to an identified document and includes a title and metadata for the document, and wherein a selection of one of the selectable items causes the document corresponding to the selected selectable item to be selected.

9. The apparatus of claim 1, wherein the at least one processor is further configured to execute the set of instructions to:
  receive, via the user interface, an input of one or more document tags, while displaying a document; and
  update one or more document tags associated with the document based on the input of the one or more document tags.

10. The apparatus of claim 1, wherein the at least one processor is further configured to execute the set of instructions to:
  determine a relationship between the first cell and the second cell of the plurality of cells by at least:
    determining a first document tag type common to both the first cell and the second cell, wherein respective values of the first document tag type associated with the first cell and the second cell are different; and
    determining a relationship between the respective values of the first document tag type associated with the first cell and the second cell.

11. The apparatus of claim 1, wherein the at least one processor is further configured to execute the set of instructions to:
  determine the relationships among the plurality of cells in the object model by at least:
    for each pair of cells:
      comparing the imaginary distance between the multi-dimensional vectors associated with the pair of cells to a threshold; and
      in response to the imaginary distance satisfying the threshold, determining that a relationship exists between the pair of cells.

12. The non-transitory computer readable medium of claim 2, wherein the method further comprises:
  identifying, from the data storage devices, at least one or more documents associated with the first cell; and
  providing, for displaying in the user interface, at least one of the one or more documents associated with the first cell.

13. The non-transitory computer readable medium of claim 2, wherein the method further comprises:
  receiving, via the user interface, a selection of a document from the one or more documents associated with the second cell; and
  responsive to the selection of the document, updating the search criteria to include indications of one or more document tags associated with the document.

14. The non-transitory computer readable medium of claim 2, wherein the document tags associated with the cells include multiple dimensions, and wherein the user interface provides an input selection field for each dimension or a single input selection field that can receive a combination of dimensions of document tags.

15. The non-transitory computer readable medium of claim 2, wherein the user interface provides a drop down menu to display one more document tags for selection.

16. The non-transitory computer readable medium of claim 2, wherein the user interface displays a list of selectable items representing the one or more documents associated with the second cell, wherein each item corresponds to an identified document and includes a title and metadata for the document, and wherein a selection of one of the selectable items triggers the document corresponding to the selected selectable item to be selected.

17. The non-transitory computer readable medium of claim 2, wherein the method further comprises:
  receiving, via the user interface, an input of one or more document tags, while displaying a document; and
  updating one or more tags associated with the document based on the input of the one or more document tags.

18. The non-transitory computer readable medium of claim 2, wherein the method further comprises:
  determining the relationships among the plurality of cells in the object model by at least:
    for each pair of cells:
      comparing the imaginary distance between the multi-dimensional vectors associated with the pair of cells to a threshold; and
      in response to the imaginary distance satisfying the threshold, determining that a relationship exists between the pair of cells.

19. The computer-implemented method of claim 3 further comprising:
  identifying, from the data storage devices, at least one or more documents associated with the first cell; and
  providing, for displaying in the user interface, at least one of the one or more documents associated with the first cell.

20. The computer-implemented method of claim 3 further comprising:
  receiving, via the user interface, a selection of a document from the one or more documents associated with the second cell; and
  responsive to the selection of the document, updating the search criteria to include indications of one or more document tags associated with the document.

21. The computer-implemented method of claim 3 further comprising:
  determining the relationships among the plurality of cells in the object model by at least:
    for each pair of cells:
      comparing the imaginary distance between the multi-dimensional vectors associated with the pair of cells to a threshold; and
      in response to the imaginary distance satisfying the threshold, determining that a relationship exists between the pair of cells.

* * * * *